(12) United States Patent
Mori

(10) Patent No.: US 11,530,959 B2
(45) Date of Patent: Dec. 20, 2022

(54) PRESSURE SENSING ELEMENT AND PRESSURE SENSOR HAVING A DIAPHRAGM THAT INCLUDES A TRENCH AND A PLURALITY OF BEAMS

(71) Applicant: Takayuki Mori, Isehara (JP)

(72) Inventor: Takayuki Mori, Isehara (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 197 days.

(21) Appl. No.: 17/006,981

(22) Filed: Aug. 31, 2020

(65) Prior Publication Data

US 2021/0072105 A1 Mar. 11, 2021

(30) Foreign Application Priority Data

Sep. 5, 2019 (JP) .............................. JP2019-161644
Sep. 5, 2019 (JP) .............................. JP2019-161647

(51) Int. Cl.
 *G01L 9/00* (2006.01)
(52) U.S. Cl.
 CPC .......... *G01L 9/0055* (2013.01); *G01L 9/0047* (2013.01)
(58) Field of Classification Search
 None
 See application file for complete search history.

(56) References Cited

U.S. PATENT DOCUMENTS

| | | | |
|---|---|---|---|
| 6,528,340 B2* | 3/2003 | Haji-Sheikh | G01L 9/0042 73/514.01 |
| 6,796,193 B2* | 9/2004 | Haji-Sheikh | G01L 9/0042 73/514.01 |
| 8,381,596 B2 | 2/2013 | Doering et al. | |
| 9,267,857 B2* | 2/2016 | Stewart | G01L 9/0054 |
| 9,764,947 B2 | 9/2017 | Chiou et al. | |
| 10,295,421 B2* | 5/2019 | Stewart | G01L 9/0045 |
| 10,370,243 B2* | 8/2019 | Stewart | G01L 9/0054 |

* cited by examiner

*Primary Examiner* — Peter J Macchiarolo
*Assistant Examiner* — Jermaine L Jenkins
(74) *Attorney, Agent, or Firm* — Holtz, Holtz & Volek PC

(57) ABSTRACT

Disclosed is a pressure sensing element that is formed using a semiconductor substrate, the pressure sensing element including: a frame; a diaphragm that is supported by the frame; and a piezoresistor that is arranged on the diaphragm. The diaphragm includes a trench and a plurality of beams, the beams are arranged such that the beams connect a portion around an edge of the diaphragm to a portion around a center of the diaphragm and the beams cross each other in the portion around the center of the diaphragm, and a beam that is each of the beams includes a narrow portion that has a first width and a wide portion that has a second width wider than the first width.

18 Claims, 15 Drawing Sheets

|  | W2/W0 | Span VOLTAGE (mV) | OUTPUT LINEARITY (%FS) |
|---|---|---|---|
| COMPARATIVE EXAMPLE 1 | — | 119.09 | 1.47 |
| COMPARATIVE EXAMPLE 2 | — | 111.49 | 0.2 |

PRESSURE SENSING ELEMENT AND PRESSURE SENSOR HAVING A DIAPHRAGM THAT INCLUDES A TRENCH AND A PLURALITY OF BEAMS

CROSS-REFERENCE TO RELATED APPLICATION

This application is based upon and claims the benefit of priority from the prior Japanese Patent Applications No. 2019-161644 filed on Sep. 5, 2019 and No. 2019-161647 filed on Sep. 5, 2019, the entire contents of which are incorporated herein by reference.

BACKGROUND

Technical Field

The present invention relates to a pressure sensing element and a pressure sensor.

Background Art

In recent years, a pressure sensor formed by using an MEMS (Micro Electro Mechanical Systems) technique is used for various devices such as a blood pressure gauge, a CPAP (Continuous Positive Airway Pressure) device, a TPMS (Tire Pressure Monitoring System), and a MAP (Manifold Air Pressure) sensor.

Such a pressure sensor is made by forming a diaphragm by etching a part of the pressure sensing element formed of a semiconductor substrate from the back surface, and providing a piezoresistor which detects the distortion of diaphragm as the change in resistance on the diaphragm.

Thus, the pressure can be measured by detecting the change in electrical resistance of the piezoresistor caused by the distortion of diaphragm when the pressure is applied.

In such a pressure sensor, improving the detection sensitivity is important for enabling the detection of minute change in pressure and improving the linearity of output is important for reducing the detection error.

Thus, in order to improve the detection sensitivity and output linearity, there has been known a sensor including, on a diaphragm, a trench which has the surface removed to become thin and a nearly cross-shaped beam which has the surface not removed and which is thick compared to the trench, by removing the surface of the diaphragm by the etching process or the like with a part of the surface left (for example, see U.S. Pat. No. 9,764,947).

Similarly, in order to improve the detection sensitivity and output linearity, there has been known a sensor including, in addition to the trench and the beam, the boss in a center of the diaphragm by leaving a portion which does not have the surface removed in a rectangular shape or a circle shape, and forming the beam such that the beam connects the above boss to the frame around the diaphragm (for example, see U.S. Pat. No. 8,381,596).

In the pressure sensor described in U.S. Pat. No. 9,764,947, improving of the output linearity is not sufficient though it is possible to sufficiently improve the detection sensitivity.

In the pressure sensor described in U.S. Pat. No. 8,381,596, it is possible to improve the output linearity compared to the pressure sensor described in U.S. Pat. No. 9,764,947 by the boss on the diaphragm. However, since the deformation of the boss portion on the diaphragm is suppressed, improving of the detection sensitivity is not sufficient.

SUMMARY

An object of the present invention is to provide a pressure sensor which improves both of the detection sensitivity and the output linearity.

To achieve at least one of the abovementioned objects, according to an aspect of the present invention, there is provided a pressure sensing element that is formed using a semiconductor substrate, the pressure sensing element including: a frame; a diaphragm that is supported by the frame; and a piezoresistor that is arranged on the diaphragm, wherein the diaphragm includes a trench and a plurality of beams, the beams are arranged such that the beams connect a portion around an edge of the diaphragm to a portion around a center of the diaphragm and the beams cross each other in the portion around the center of the diaphragm, and a beam that is each of the beams includes a narrow portion that has a first width and a wide portion that has a second width wider than the first width.

To achieve at least one of the abovementioned objects, according to another aspect of the present invention, there is provided a pressure sensor including the above pressure sensing element.

To achieve at least one of the abovementioned objects, according to another aspect of the present invention, there is provided a pressure sensing element that is formed using a semiconductor substrate, the pressure sensing element including: a frame; a diaphragm that is supported by the frame; and a piezoresistor that is arranged on the diaphragm, wherein the diaphragm includes: a beam that protrudes in a direction toward a center of the diaphragm from an edge of the diaphragm; and a single trench that is formed in a range ranging from the edge of the diaphragm and the beam and including the center of the diaphragm.

To achieve at least one of the abovementioned objects, according to another aspect of the present invention, there is provided a pressure sensor including: the above pressure sensing element; a substrate on which the pressure sensing element is mounted; and a nozzle through which a fluid that is a target of pressure sensing is introduced to the pressure sensing element.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DESCRIPTION OF EMBODIMENTS

Hereinafter, embodiments of the present invention will be described with reference to FIGS. 1 to 25. However, the technical scope of the present invention is not limited to the illustrated examples, and various changes can be made to the embodiments described below within the scope of the present invention.

[1 First Embodiment]

A pressure sensor 100 according to the first embodiment will be described with reference to FIGS. 1 to 7.

[(1) Configuration of Embodiment]

Figure 1:
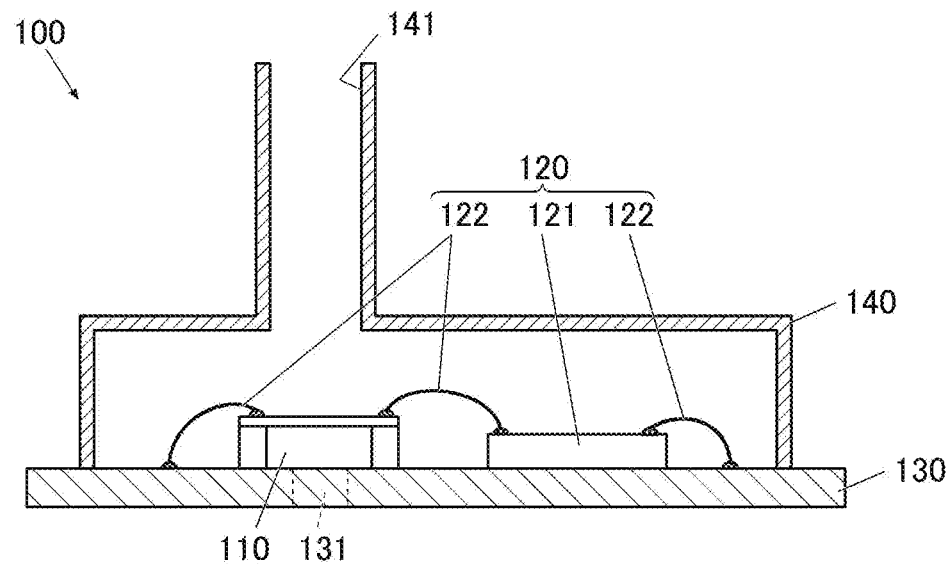
FIG. 1 is a schematic view showing the configuration of a pressure sensor according to a first embodiment.

The pressure sensor 100 according to the first embodiment includes a pressure sensing element 110, a circuit part 120, a substrate 130 and a nozzle 140, as shown in FIG. 1.

[A Pressure Sensing Element]

Figure 2:
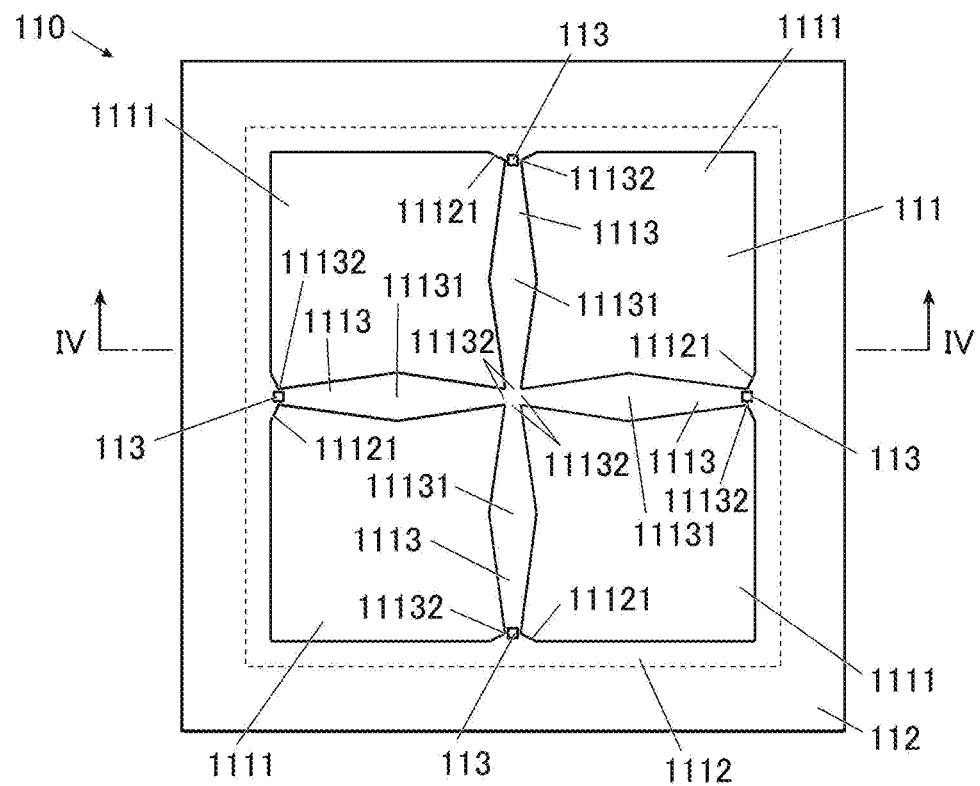
FIG. 2 is a plan view seen from the upper surface side of a pressure sensing element of the pressure sensor according to the first embodiment.
Figure 3:
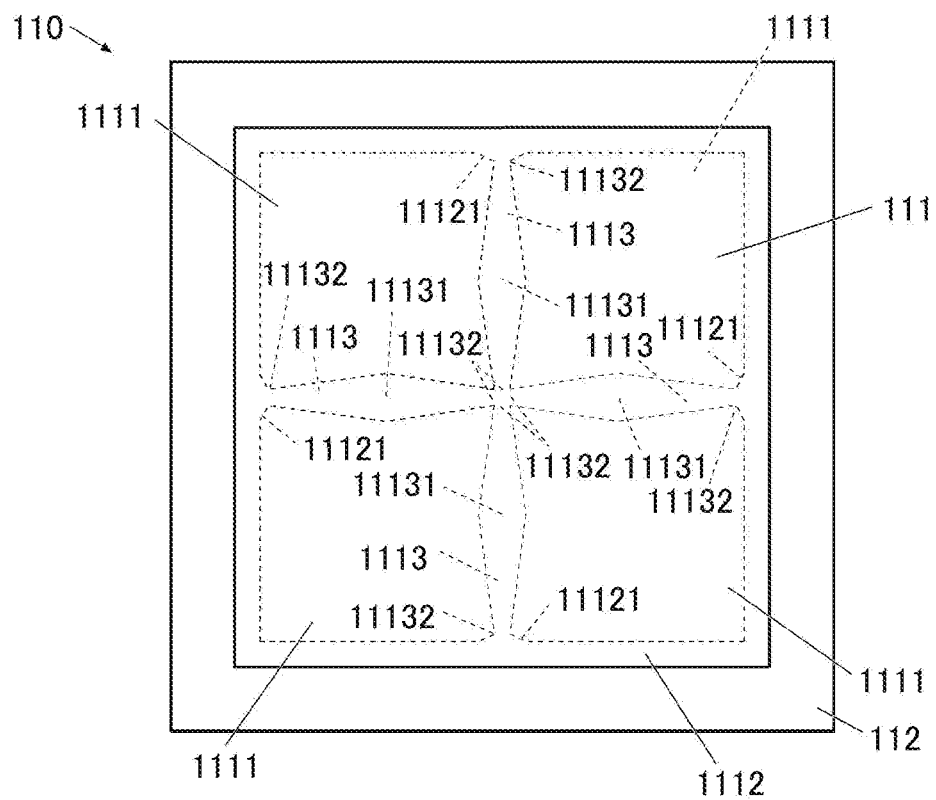
FIG. 3 is a plan view seen from the lower surface side of the pressure sensing element of the pressure sensor according to the first embodiment.

As shown in FIGS. 2 and 3, the pressure sensing element 110 is a semiconductor chip which is formed in a nearly square shape in a plan view by using a semiconductor substrate. In the present embodiment, description will be made by referring to the side where a diaphragm 111 is formed in the pressure sensing element 110 as the upper surface, and referring to the opposite side as the lower surface.

Figure 4:
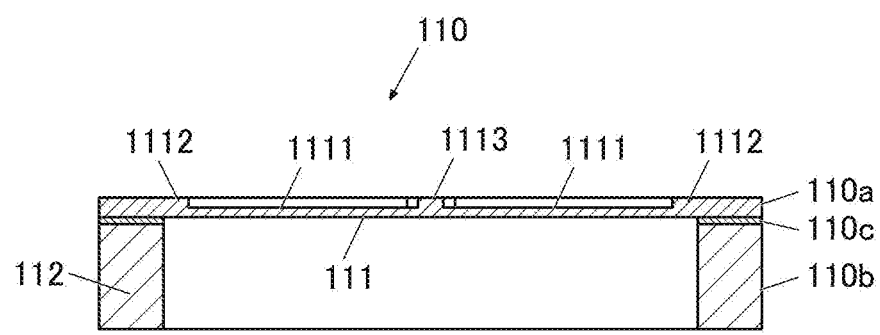
FIG. 4 is a sectional view along the IV-IV line of FIG. 2.

As shown in FIG. 4, the pressure sensing element 110 is formed of three layers that are an active layer 110a which is a silicon (Si) layer formed on the upper surface side, a supporting layer 110b which is a silicon (Si) layer formed on the lower surface side, and an insulation layer 110c formed of silicon dioxide ($SiO_2$) between the active layer 110a and the supporting layer 110b.

As shown in FIGS. 3 and 4, the pressure sensing element 110 includes a cavity in the center on the lower surface side, the upper surface side of the portion forms a diaphragm 111 and the portion not forming the cavity on the lower surface side around the diaphragm 111 forms a frame 112.

As shown in FIG. 2, the diaphragm 111 of the pressure sensing element 110 includes a piezoresistor 113 at each of four positions.

[(a) Diaphragm]

As shown in FIGS. 3 and 4, the pressure sensing element 110 has the center on the lower surface side removed by the etching process or the like in a nearly square shape in a plan view so as to leave only the active layer 110a. Thus, the pressure sensing element 110 has, on the upper surface side, the diaphragm 111 which has the active layer 110a remaining in a thin film shape.

As shown in FIGS. 2 and 3, the diaphragm 111 is formed in a nearly square shape in a plan view at the portion excluding the edges in the plan view of the pressure sensing element 110. The diaphragm 111 includes trenches 1111 which are thin, and an outer frame 1112 and beams 1113 which are thick compared to the trenches 1111.

[Trench]

As shown in FIG. 4, each of the trenches 1111 is a portion obtained by removing a part on the upper surface side of the diaphragm 111 within the range of not penetrating the active layer 110a by the etching process or the like. The trench 1111 is a portion formed to be thin compared to the outer frame 1112 and the beams 1113 in the diaphragm 111.

As shown in FIGS. 2 and 3, the trenches 1111 are formed over the entire upper surface side of the diaphragm 111 excluding the outer frame 1112 and the beams 1113 such that the trenches 1111 are divided into four positions by the beams 1113.

[Outer Frame]

As shown in FIGS. 2 and 3, the trenches 1111 are formed leaving the edges of the diaphragm 111 by having an interval between the trenches 1111 and the border between the diaphragm 111 and the frame 112. That is, the trenches 1111 are not formed in the edges of the diaphragm 111, the upper surface side of the active layer 110a is not removed around the edges of the diaphragm 111, and the outer frame 1112 which is thick compared to the trenches 1111 is formed.

As shown in FIGS. 2 and 3, the outer frame 1112 includes protrusions 11121 protruding in respective directions toward the center of the diaphragm 111, the protrusions 11121 being located around the centers of respective sides of the diaphragm 111 which is in the nearly square shape. Each of the protrusions 11121 is formed to have the width in the plan view becoming gradually narrower in a direction toward the center of the diaphragm 111. The tip of each protrusion 11121 having the narrowest width is connected to the beam 1113.

[Beam]

As shown in FIGS. 2 and 3, the trenches 1111 are formed to be divided into four positions on the upper surface side of the diaphragm 111 in the nearly square shape in a plan view. The four beams 1113 in which the upper surface side of the active layer 110a is not removed and which are thick compared to the trenches 1111 are formed between the trenches 1111 so as to connect the portion around the center of the diaphragm 111 with the portion around the edges of the diaphragm 111 (outer frame 1112).

The four beams 1113 are defined by forming the trenches 1111 in the active layer 110a by the etching process or the like as mentioned above. Each of the beams 1113 is formed in a shape connecting the portion around the center of the diaphragm 111 with the portion around the edges of the diaphragm 111 (outer frame 1112). As shown in FIGS. 2 and 3, the four beams 1113 are formed to cross each other around the center of the diaphragm 111, and formed as a whole in a nearly cross shape crossing in the center of the diaphragm 111 in a plan view.

As shown in FIGS. 2 and 3, each of the beams 1113 is formed to have a width in a plan view gradually becoming wider toward the center in a longitudinal direction of the beam 1113 from both of the end close to the edge of the diaphragm 111 and the end close to the center of the diaphragm 111. Thus, the beam 1113 includes a wide portion 11131 around the center in the longitudinal direction of the beam 1113 and narrow portions 11132 which are respectively located around the end close to the edge of the diaphragm 111 and the end close to the center of the diaphragm 111. The width (length in the direction orthogonal to the longitudinal direction of the beam 1113 in a plan view) of the wide portion 11131 is wider than the width of each of the narrow portions 11132.

The center of the diaphragm 111 indicates the portion around the center of gravity position of the shape of diaphragm 111 in a plan view. The edges of the diaphragm 111 indicate the portion around the border between the diaphragm 111 and the surrounding frame 112 in the diaphragm 111. When the outer frame 1112 is formed to go round along the border between the diaphragm 111 and the frame 112, the portion forming the outer frame 1112 is the edges of the diaphragm 111.

[(b) Frame]

As shown in FIGS. 3 and 4, in the pressure sensing element 110, only the central portion on the lower surface side is removed into a nearly square shape in a plan view by the etching process or the like. The three layers of active layer 110a, supporting layer 110b and insulation layer 110c remain in the edges of the pressure sensing element 110, and each of the edges of the pressure sensing element 110 is formed to be thick compared to the diaphragm 111 located in the center. This portion of edges is the frame 112.

[(c) Piezoresistor]

As shown in FIG. 2, the pressure sensing element 110 includes piezoresistors 113 at respective four positions around the ends of the beams 1113 close to the edge of the diaphragm 111. To be specific, a total of four piezoresistors 113 are arranged for the respective beams 1113 at the positions overlapping with the narrow portions 11132 provided around the ends of the respective beams 1113 close to the edges of the diaphragm 111, that is, at the connection parts between the respective beams 1113 and the protrusions 11121 of the outer frame 1112.

Each of the piezoresistors 113 is formed on the diaphragm 111 by diffusion or ion implantation, for example, and configured such that the electric resistivity changes in proportion to the stress generated according to the flexure amount of the diaphragm 111 when the diaphragm 111 receives a pressure and becomes bent or curved. As mentioned later, the four piezoresistors 113 are connected by the circuit part 120 so as to form the Wheatstone bridge.

[b Circuit Part]

As shown in FIG. 1, the circuit part 120 includes an ASIC (Application Specific Integrated Circuit) 121 and wires 122.

The circuit part 120 connects the four piezoresistors 113 to form the Wheatstone bridge. By applying the voltage to each piezoresistor 113, the circuit part 120 measures the pressure from the difference in output electrical potential generated by the electric resistivity of the piezoresistor 113 in proportion to the stress generated according to the flexure amount of the diaphragm. In the ASIC 121, various adjustments such as correction of the sensor output and change of the drive voltage range are performed.

Since the configuration of such a circuit part in the pressure sensor is a known technique, the detailed description thereof is omitted.

[c Substrate]

As shown in FIG. 1, the substrate 130 is a plate member having one surface to which the pressure sensing element 110 and the circuit part 120 are fixed. The substrate 130 forms an outer case of the pressure sensor 100 together with an after-mentioned nozzle 140.

As shown in FIG. 1, the pressure sensing element 110 forms a cavity on the substrate 130, the cavity being connected on the lower surface side and surrounded by the diaphragm 111 and the frame 112 of the pressure sensing element 110 and the substrate 130. The substrate 130 includes a through hole 131 directly below the pressure sensing element 110 such that the lower surface side of the pressure sensing element 110 contacts the air via the cavity.

Thus, according to the pressure of a fluid which is the detection target existing on the upper surface side of the diaphragm 111, the pressure difference between the upper surface side and the lower surface side of the diaphragm 111 is generated and the diaphragm 111 is bent or curved.

[d Nozzle]

As shown in FIG. 1, the nozzle 140 is provided so as to cover the pressure sensing element 110 and the circuit part 120 installed on the substrate 130, and the nozzle 140 includes an intake port 141 to take in the fluid for which the pressure is sensed by the pressure sensing element 110.

The substrate 130 and the nozzle 140 form the space which is connected to the outside via the intake port 141 and which has the pressure sensing element arranged therein. The pressure of the fluid introduced to the space from the intake port 141 is sensed by the pressure sensing element 110.

[(2) Effect of Embodiment]

According to the pressure sensor 100 in the present embodiment, the diaphragm 111 of the pressure sensing element 110 includes a plurality of trenches 1111 which are thin portions and a plurality of beams 1113 which are thick portions compared to the trenches 1111. Each of the beams 1113 includes narrow portions 11132 which are respectively located around the end of the beam 1113 close to the edge of the diaphragm 111 and around the end of the beam 1113 close to the center of the diaphragm 111, and the beam 1113 includes a wide portion 11131 around the center in the longitudinal direction of the beam 1113, the wide portion 11131 having the width wider than that of the narrow portion 11132.

Thus, it is possible to improve the output linearity of the pressure sensor by changing the deformation mechanism of diaphragm when the diaphragm receives the pressure compared to a configuration in which the beam is formed in a straight line shape on the diaphragm of the pressure sensing element as in the pressure sensor described in U.S. Pat. No. 9,764,947, for example.

Such an effect can be more enhanced by forming the beam 1113 to have a width gradually becoming wider toward the wide portion 11131 from the narrow portions 11132.

At this time, the configuration merely simply provides a wide portion to the beam compared to a configuration in which the boss is formed in addition to the beam on the diaphragm of the pressure sensing element as in the pressure sensor described in U.S. Pat. No. 8,381,596, for example. Thus, it is possible to avoid the reduction in area of the trench on the diaphragm.

The sensitivity of the pressure sensor depends on the deformation amount of the diaphragm of the pressure sensing element, that is, the easiness of deformation when receiving the pressure. The trench which is the thin portion is easy to deform in the diaphragm. Thus, the sensitivity of pressure sensor is influenced by the size of area of the trench on the diaphragm of the pressure sensing element.

With respect to this, according to the pressure sensor 100 in the present embodiment, it is possible to avoid the reduction in area of trench on the diaphragm 111 of the pressure sensing element 110. Thus, it is possible to avoid the reduction of sensitivity while improving the output linearity of the pressure sensor.

According to the pressure sensor 100 in the present embodiment, the piezoresistors 113 of the pressure sensing element 110 are arranged at the positions overlapping with the narrow portions 11132 of the beams 1113. Thus, since the piezoresistors 113 can be arranged on the portions which have the thick beams 11113 having narrow widths of the diaphragm 111 and get easily deformed, it is possible to improve the sensitivity.

According to the pressure sensor 100 in the present embodiment, the outer frame 1112 of the diaphragm 111 of the pressure sensing element 110 includes the protrusions 11121 at the connection parts to the beams 1113, the protrusions 11121 protruding in a direction toward the center of the diaphragm 111 and having the width which gradually becomes narrow toward the connection parts to the beams 1113. The piezoresistors 113 are arranged at the connection parts between the beams 1113 and the protrusions 11121. Thus, since the portions around the ends of the beams 1113 close to the edges of the diaphragm 111, where the piezoresistors 113 are arranged, can be easily deformed, it is possible to improve the sensitivity.

According to the pressure sensor 100 in the present embodiment, the trenches 1111 are not formed in the edges of the diaphragm 111 of the pressure sensing element 110, and the outer frame 1112 is provided such that the outer frame 1112 goes round along the edges of the diaphragm 111. Thus, since the piezoresistors 113 arranged near the ends of the beams 1113 close to the edges of the diaphragm 111 are arranged at the positions separate from the frame 112 by the amount of the outer frame 1112, the piezoresistors 113 are arranged at the positions not easily influenced by the frame 112 for the deformation of the diaphragm 111, and it is possible to improve the sensitivity.

[(3) Modification Examples]

As shown in FIGS. 2 and 3, the above embodiment has been described for a configuration in which each of the wide portions 11131 is formed around the center in the longitudinal direction of the beam 1113 in the diaphragm 111, and the narrow portions 11132 are formed around both ends of the beam 1113. However, the positions to form the wide portions and the narrow portions are not limited to the above positions.

Figure 5:
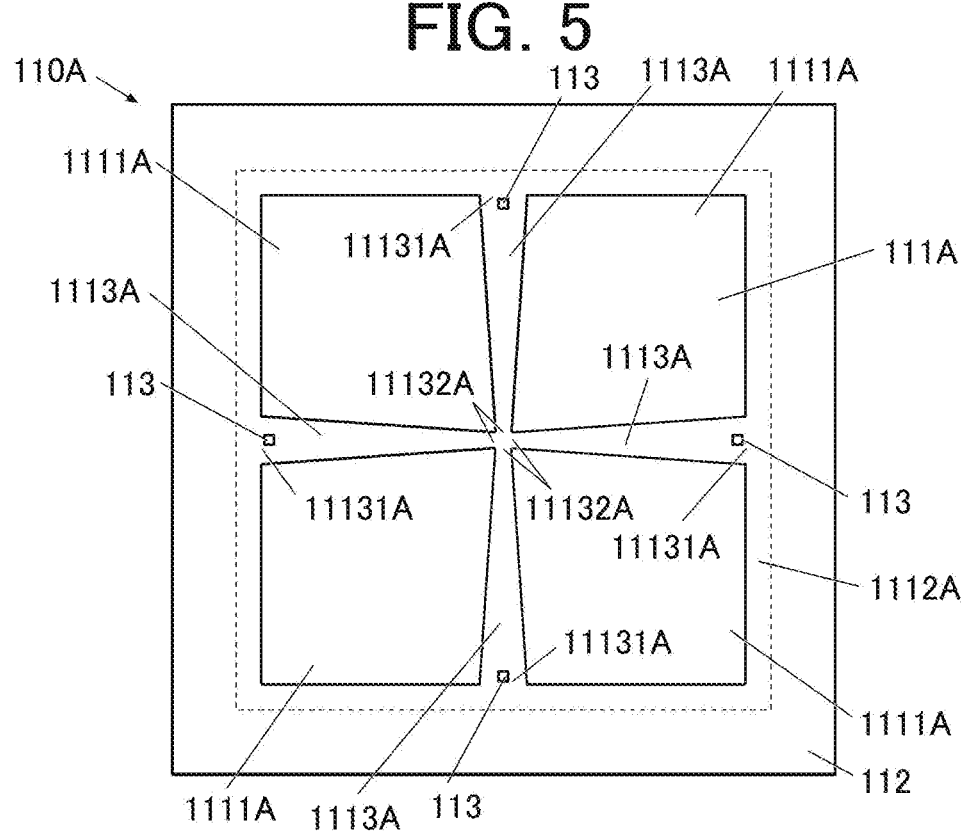
FIG. 5 is a plan view seen from the upper surface side of a pressure sensing element of a pressure sensor according to a modification example 1 of the first embodiment.

For example, as in a pressure sensing element 110A according to a modification example 1 shown in FIG. 5, the trenches 1111A are formed such that, for each of beams 1113A, a wide portion 11131A may be formed around the border between the beam 1113A and an outer frame 1112A such that the wide portion 11131A has the width gradually becoming wider in a direction toward the edge of the diaphragm 111A from a narrow portion 11132A formed around the crossing portion of beams 1113A in the center of the diaphragm 111A.

Also in this configuration, it is possible to improve the output linearity compared to a configuration in which each of the beams is formed in a straight line shape on the diaphragm of the pressure sensing element as in the pressure sensor described in U.S. Pat. No. 9,764,947, for example.

In this configuration, since it is not possible to arrange the piezoresistors 113 at the positions where the beams 1113A have a narrow width, the effect of improving the sensitivity is reduced compared to the configuration of using the pressure sensing element 110 according to the above embodiment. However, compared to the configuration of forming the boss in addition to the beam on the diaphragm of the pressure sensing element as in the pressure sensor described in U.S. Pat. No. 8,381,596, for example, the reduction in area of the trench is small, and thus, it is possible to avoid the reduction in sensitivity.

Figure 6:
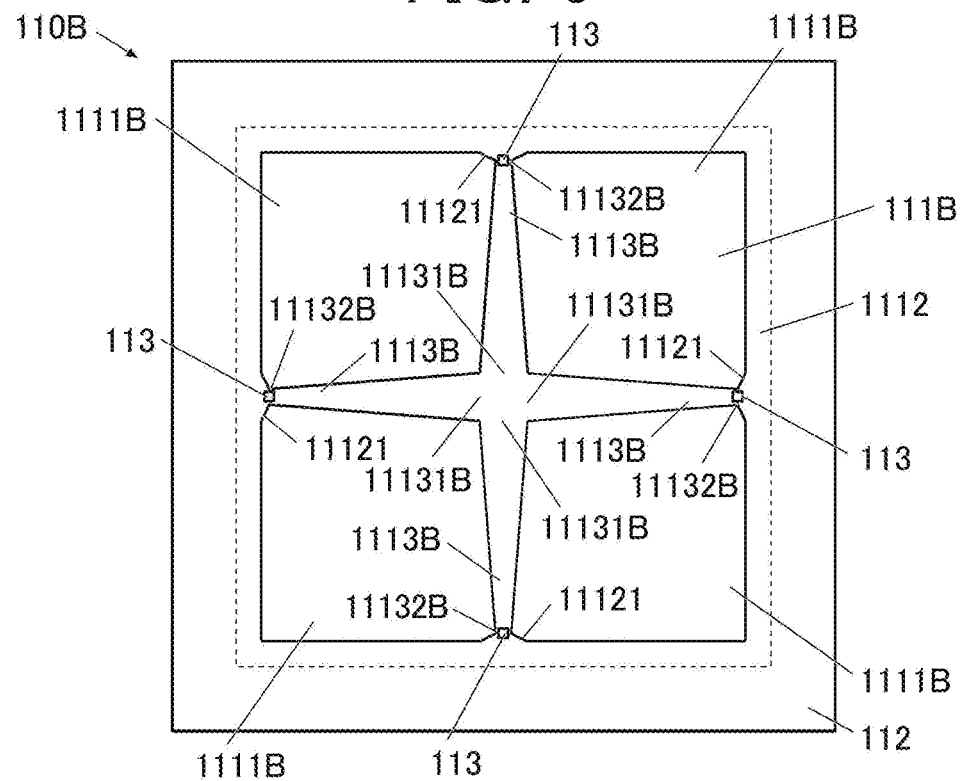
FIG. 6 is a plan view seen from the upper surface side of a pressure sensing element of a pressure sensor according to a modification example 2 of the first embodiment.

Moreover, as in the pressure sensing element 110B according to the modification example 2 shown in FIG. 6 for example, the trenches 1111B are formed such that for each of the beams 1113B, a wide portion 11131B may be formed around the crossing portion of beams 1113B around the center of the diaphragm 111B such that the wide portion 11131B has a width gradually becoming wider in a direction toward the center of the diaphragm 111B from a narrow portion 11132B formed around the border between the beam 1113B and the outer frame 1112.

In the above embodiment, the shape of the trench 1111 on the diaphragm 111 has been described for a configuration in which each portion not facing the beams 1113 forms a right angle along the frame 112. However, the shape of the trench is not limited to this.

Figure 7:
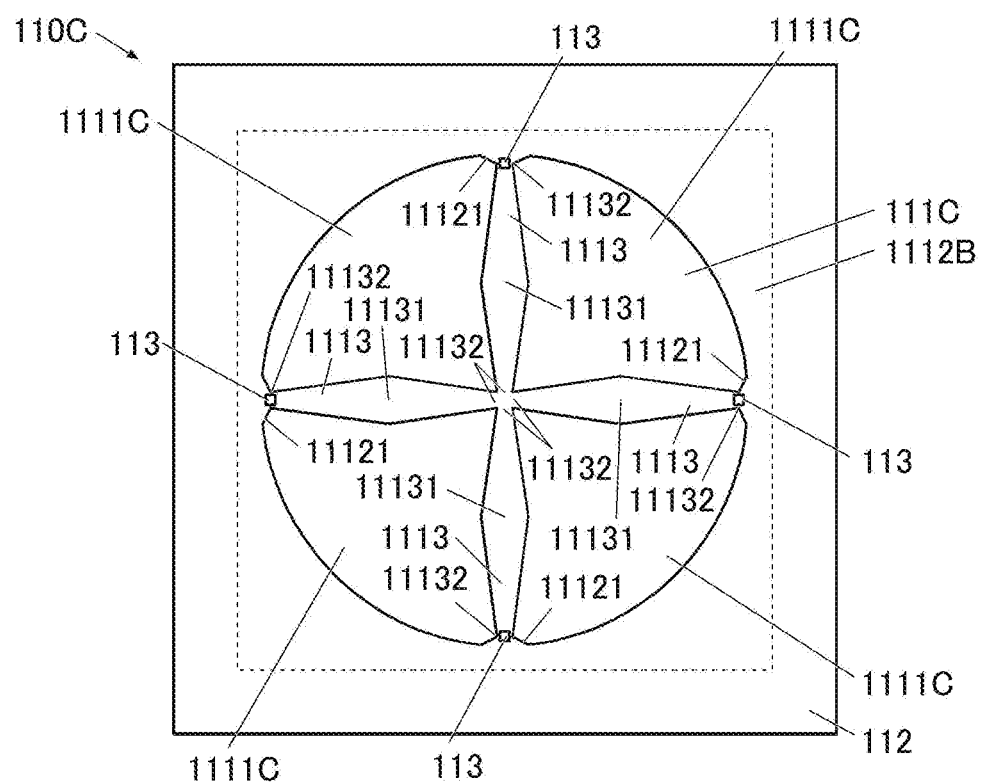
FIG. 7 is a plan view seen from the upper surface side of a pressure sensing element of a pressure sensor according to a modification example 3 of the first embodiment.

For example, as in a pressure sensing element 110C according to a modification example 3 shown in FIG. 7, for a diaphragm 111C surrounded by outer frame 11128, each of trenches 1111C may be formed such that the portion not facing the beams 1113 makes an arc.

The layer structure of the pressure sensing element is not limited to the above three-layer structure. For example, the structure may be a single-layer structure of silicon not having the $SiO_2$ layer as the insulation layer. For the supporting layer, materials such as glass may be used.

As for the configurations (circuit part 120, substrate 130 and nozzle 140) other than the pressure sensing element 110 in the pressure sensor 100, any configuration may be used as long as the configuration can function as a pressure sensor, and various modifications can be made.

For example, the above description has been made for a configuration in which air is introduced into the cavity on the lower surface side of the diaphragm 111 in the pressure sensing element 110 to make the lower surface side of the pressure sensing element 110 contact the air and the fluid which is the target to measure the pressure is introduced to the upper surface side. However, the through hole 131 may not be provided to the substrate 130 and the cavity surrounded by the diaphragm 111 and the frame 112 in the pressure sensing element 110 and the substrate 130 may be low vacuum. Alternatively, contrary to the above, the space on the upper surface side of the diaphragm 111 in the pressure sensing element 110 may be filled with air or may be made low vacuum, and the fluid which is the target to measure the pressure may be introduced into the cavity on the lower surface side.

[2 Second Embodiment]

A pressure sensor 200 according to a second embodiment will be described with reference to FIGS. 8 to 12.

[(1) Configuration of Embodiment]

Figure 8:
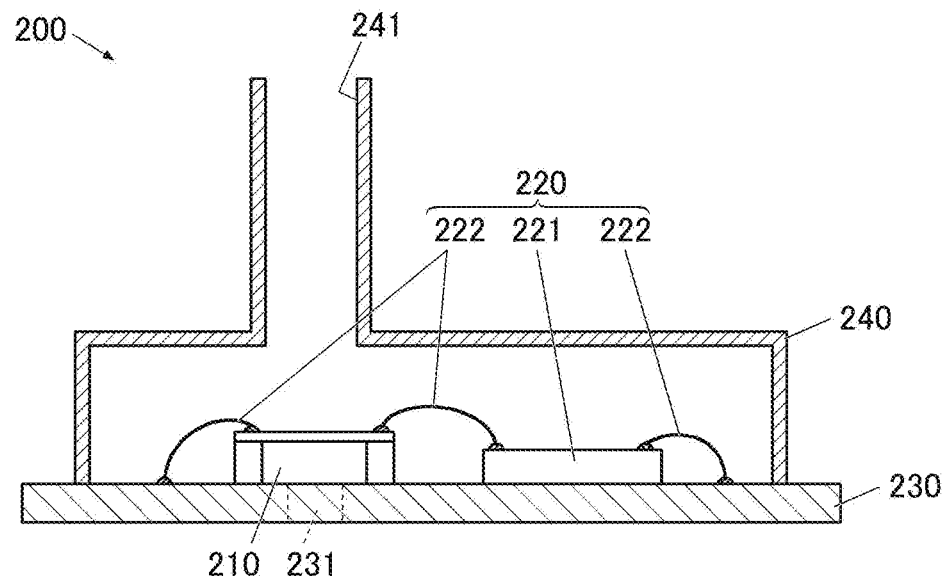
FIG. 8 is a schematic view showing the configuration of a pressure sensor according to a second embodiment.

The pressure sensor 200 according to the second embodiment includes a pressure sensing element 210, a circuit part 220, a substrate 230 and a nozzle 240, as shown in FIG. 8.

[A Pressure Sensing Element]

Figure 9:
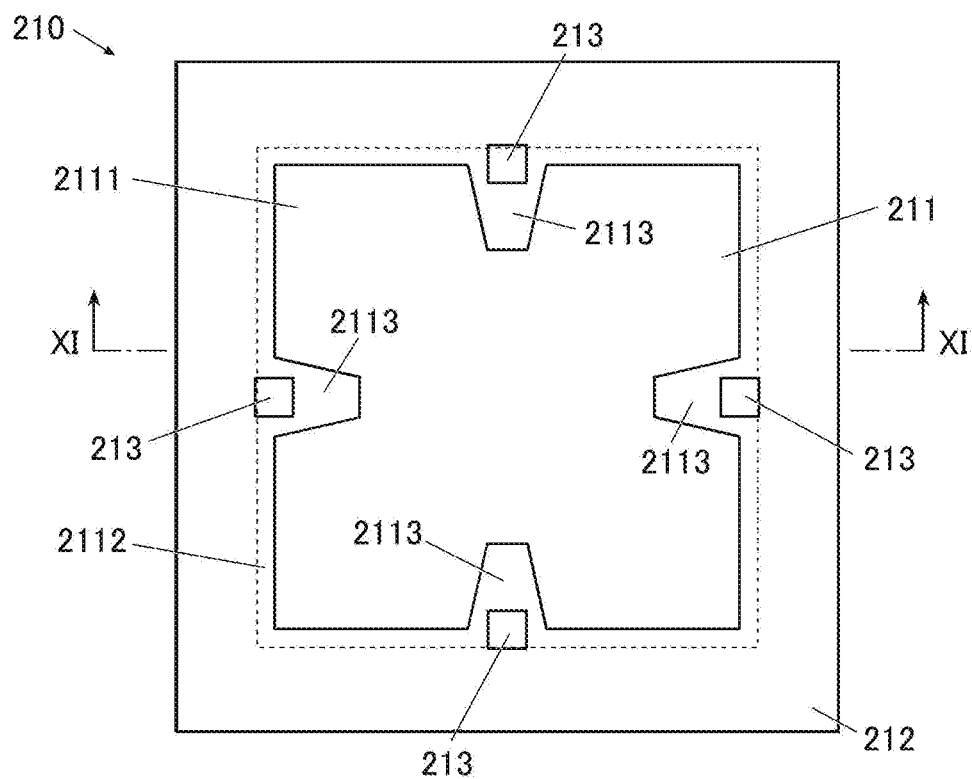
FIG. 9 is a plan view seen from the upper surface side of a pressure sensing element of the pressure sensor according to the second embodiment.
Figure 10:
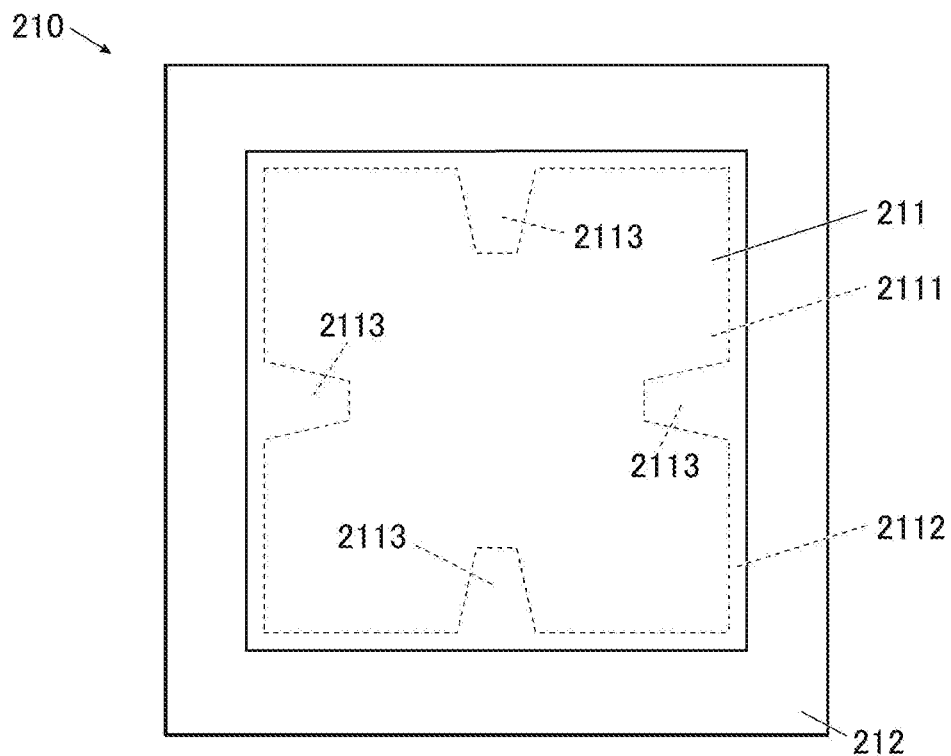
FIG. 10 is a plan view seen from the lower surface side of the pressure sensing element of the pressure sensor according to the second embodiment.

As shown in FIGS. 9 and 10, the pressure sensing element 210 is a semiconductor chip which is formed in a nearly square shape in a plan view by using a semiconductor substrate. In the present embodiment, description will be made by referring to the side where a diaphragm 211 is formed in the pressure sensing element 210 as the upper surface, and referring to the opposite side as the lower surface.

Figure 11:
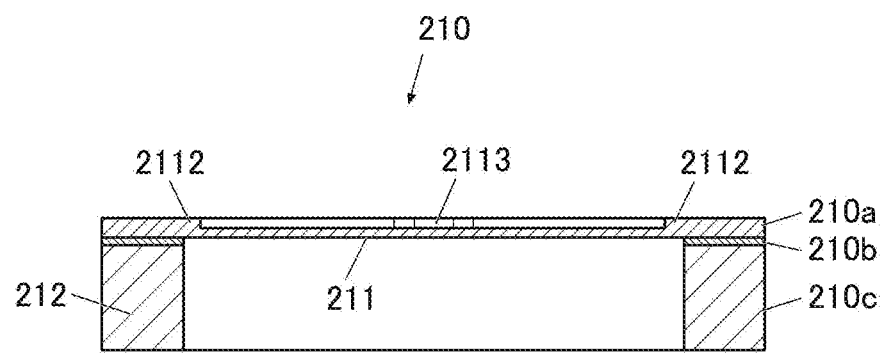
FIG. 11 is a sectional view along the XI-XI line of FIG. 9.

As shown in FIG. 11, the pressure sensing element 210 is formed of three layers that are an active layer 210*a* which is a silicon (Si) layer formed on the upper surface side, a supporting layer 210*c* which is a silicon (Si) layer formed on the lower surface side, and an insulation layer 210*b* formed of silicon dioxide (SiO$_2$) between the active layer 210*a* and the supporting layer 210*c*.

As shown in FIGS. 10 and 11, the pressure sensing element 210 includes a cavity in the center on the lower surface side, the upper surface side of the portion forms a diaphragm 211 and the portion not forming the cavity on the lower surface side around the diaphragm 211 forms a frame 212.

As shown in FIG. 9, the diaphragm 211 of the pressure sensing element 210 includes a piezoresistor 213 at each of four positions.

[(a) Diaphragm]

As shown in FIGS. 10 and 11, the pressure sensing element 210 has the center on the lower surface side removed by the etching process or the like in a nearly square shape in a plan view so as to leave only the active layer 210*a*. Thus, the pressure sensing element 210 has the diaphragm 211 on the upper surface side in which the active layer 210*a* remains in a thin film shape.

As shown in FIGS. 9 and 10, the diaphragm 211 is formed in a nearly square shape in a plan view in the portion excluding the edges in the plan view of the pressure sensing element 210. The diaphragm 211 includes a trench 2111 which is thin, and an outer frame 2112 and beams 2113 which are thick compared to the trench 2111.

[Trench]

As shown in FIG. 11, the trench 2111 is a portion obtained by removing a part of the upper surface side of the diaphragm 211 within the range of not penetrating the active layer 210*a* by the etching process or the like, and integrally formed with the outer frame 2112 and the beams 2113. The trench 2111 is a portion formed to be thin compared to the outer frame 2112 and the beams 2113.

As shown in FIGS. 9 and 10, the trench 2111 is a single trench which is formed over the entire surface of the range ranging from the outer frame 2112 and the beams 2113 and including the center of the diaphragm 211, and the entire surface of the trench 2111 is formed to have a uniform thickness.

[Outer Frame]

As shown in FIGS. 9 and 10, the trench 2111 is formed to leave edges of the diaphragm 211 by having an interval between the trench 2111 and the border between the diaphragm 211 and the frame 212. That is, the trench 2111 is not formed in the edges of the diaphragm 211, and the outer frame 2112 which is arranged to go round along the edges of the diaphragm 211 and which is thick compared to the trench 2111 is formed.

[Beam]

As shown in FIGS. 9 and 10, around the centers of respective sides of the diaphragm 211 which is formed in a nearly square shape, four beams 2113 which are thick portions compared to the trench 2111 are provided such that each of the beams 2113 protrudes in the direction toward the center of the diaphragm 211 from the edge of the diaphragm 211. The four beams 2113 are defined by forming the trench 2111 in the active layer 210*a* by the etching process or the like as mentioned above. Each of the beams 2113 is formed in a shape protruding in a direction toward the center of the diaphragm 211. As shown in FIGS. 9 and 10, the four beams 2113 do not cross each other around the center of the diaphragm 211, and formed to be independent from each other.

As shown in FIGS. 9 and 10, each of the beams 2113 is formed to have a width in a plan view gradually becoming narrower in a direction toward the center of the diaphragm 211.

The center of the diaphragm 211 indicates the portion around the center of gravity position of the shape of diaphragm 211 in a plan view. The edge of the diaphragm 211 indicates the portion around the border between the diaphragm 211 and the surrounding frame 212 in the diaphragm 211. When the outer frame 2112 is formed to go round along the border between the diaphragm 211 and the frame 212, the portion forming the outer frame 2112 is the edge of the diaphragm 211.

[(b) Frame]

As shown in FIGS. 10 and 11, in the pressure sensing element 210, only the center on the lower surface side is removed into a nearly square shape in a plan view by the etching process or the like. The three layers of active layer 210*a*, supporting layer 210*c* and insulation layer 210*b* remain in the edges of the pressure sensing element 210, and each of the edges of the pressure sensing element 210 is formed to be thick compared to the diaphragm 211. This portion of edges is the frame 212.

[(c) Piezoresistor]

As shown in FIG. 9, the pressure sensing element 210 includes piezoresistors 213 arranged on the diaphragm 211.

A total of four piezoresistors 213 are arranged for the respective beams 2113 such that the piezoresistors 213 are arranged around the ends of the respective beams 2113 close to the edge of the diaphragm 211, to be specific, at the positions overlapping with the connection parts between the respective beams 2113 and the outer frame 2112.

It is not essential to locate the entire piezoresistor 213 on the diaphragm 211. As shown in FIG. 9, a part of the piezoresistor may be located on the frame 212. Also in such a configuration, the present disclosure describes that the piezoresistor 213 is arranged on the diaphragm 211 as long as any other part of the piezoresistor 213 is located on the diaphragm 211. However, it is preferable that at least the center of the piezoresistor 213 is located on the diaphragm 211.

Each of the piezoresistors 213 is formed on the diaphragm 211 by diffusion or ion implantation, for example, and configured such that the electric resistivity changes in proportion to the stress generated according to the flexure amount of the diaphragm 211 when the diaphragm 211 receives a pressure and becomes bent or curved. As mentioned later, the four piezoresistors 213 are connected by the circuit part 220 so as to form the Wheatstone bridge.

[b Circuit Part]

As shown in FIG. 8, the circuit part 220 includes an ASIC (Application Specific Integrated Circuit) 221 and wires 222.

The circuit part 220 connects the four piezoresistors 213 to form the Wheatstone bridge. By applying the voltage to the piezoresistor 213, the circuit part 220 measures the pressure from the difference in output electrical potential generated by the electric resistivity of the piezoresistor 213 in proportion to the stress generated according to the flexure amount of the diaphragm. In the ASIC 221, various adjustments such as correction of the sensor output and change of the drive voltage range are performed.

Since the configuration of such a circuit part in the pressure sensor is a known technique, the detailed description thereof is omitted.

[c Substrate]

As shown in FIG. 8, the substrate 230 is a plate member having one surface to which the pressure sensing element 210 and the circuit part 220 are fixed, and the substrate 230 forms an outer case of the pressure sensor 200 together with an after-mentioned nozzle 240.

As shown in FIG. 8, the pressure sensing element 210 forms a cavity on the substrate 230, the cavity being connected on the lower surface side and surrounded by the diaphragm 211 and the frame 212 of the pressure sensing element 210 and the substrate 230. The substrate 230 includes a through hole 231 directly below the pressure sensing element 210 such that the lower surface side of the pressure sensing element 210 contacts the air via the cavity.

Thus, the pressure difference between the upper surface side and the lower surface side of the diaphragm 211 is generated according to the pressure of a fluid which is the detection target existing on the upper surface side of the diaphragm 211, and the diaphragm 211 is bent or curved.

[d Nozzle]

As shown in FIG. 8, the nozzle 240 is provided so as to cover the pressure sensing element 210 and the circuit part 220 installed on the substrate 230, and includes an intake port 241 to take in the fluid for which the pressure is sensed by the pressure sensing element 210.

The substrate 230 and the nozzle 240 form the space which is connected to the outside via the intake port 241 and which has the pressure sensing element arranged therein. The pressure of the fluid introduced to the space from the intake port 241 is sensed by the pressure sensing element 210.

[(2) Effect of Embodiment]

The pressure sensor 200 according to the present embodiment includes a trench 2111 which is a thin portion and a plurality of beams 2113 which are thick portions compared to the trench 2111 in the diaphragm 211 of the pressure sensing element 210.

When the diaphragm formed in the pressure sensing element of the pressure sensor is a flat plane, the detection sensitivity and the output linearity have a tradeoff relationship. There is a tendency that, as the diaphragm is thinner, the diaphragm deforms more easily and the detection sensitivity is improved, but the output linearity decreases.

With respect to this, according to the present embodiment, the sensitivity is improved by forming a trench 2111 to be continuous in a range including the center on the upper surface side of the diaphragm to make the diaphragm thin, while preventing the reduction in output linearity by leaving the beams 2113 each of which has no trench 2111 formed and is a thick portion such that the beam 2113 protrudes from the edge of the diaphragm.

At this time, for example, when compared with a configuration forming the beams in a nearly cross shape on the diaphragm of the pressure sensing element as in the pressure sensor described in U.S. Pat. No. 9,764,947, the beams 2113 are formed separate from each other, and not formed up to the center of the diaphragm. Thus, it is possible to avoid the reduction in area of the trench which is a thin portion in the diaphragm. Such an effect can be enhanced more by forming the beam 2113 to have a width which gradually becomes narrower toward the center of the diaphragm 211.

Even in a configuration forming the beams in a nearly cross shape on the diaphragm of the pressure sensing element as in the pressure sensor described in U.S. Pat. No. 9,764,947, the reduction in area of trench can be avoided by forming the beam to be slim (narrow). However, when the pressure sensing element is made smaller, the possible slimness of the beam reaches the limit at a certain level due to the limit of process accuracy and the beam becomes thick with respect to the trench, which reduces the rate of the area of trench to the area of diaphragm. This point also applies to the pressure sensor described in U.S. Pat. No. 8,381,596 forming the boss in addition to the trench and beam, since making the boss small also has a limit.

On the other hand, according to the present embodiment, the trench 2111 is formed to be continuous in the range including the center of the upper surface side of the diaphragm 211, and the shape of the trench 2111 is simple compared with the pressure sensors described in U.S. Pat. Nos. 9,764,947 and 8,381,596. Thus, even when the pressure sensing element 210 is made small, it is possible to avoid the reduction in area of the trench 2111 in the diaphragm 211 caused by the limit of the process accuracy.

According to the pressure sensor 200 in the present embodiment, the piezoresistors 213 of the pressure sensing element 210 are arranged around the ends of the beams 2113 close to the edges of diaphragm 211, to be specific, at the positions overlapping with the connection parts between the respective beams 2113 and the outer frame 2112. Thus, since the piezoresistors 213 can be arranged at the portions where the diaphragm 211 can deform easily, it is possible to improve the sensitivity.

According to the pressure sensor 200 in the present embodiment, the trench 2111 is not formed in the edges of the diaphragm 211 of the pressure sensing element 210, and the outer frame 2112 is provided to go round along the edges of the diaphragm 211. Thus, since the piezoresistors 213 arranged near the ends of the beams 2113 close to the respective edges of the diaphragm 211 are arranged at the positions separate from the frame 212 by the amount of the outer frame 2112, the piezoresistors 213 are arranged at the positions not easily influenced by the frame 212 for the deformation of the diaphragm 211, and it is possible to improve the sensitivity.

[(3) Modification Example]

The above embodiment has been described for a configuration in which the center on the lower surface side of the pressure sensing element 210 is removed into a nearly square shape in a plan view by the etching process or the like and the diaphragm 211 is formed in a nearly square shape in a plan view. However, the shape of the diaphragm is not limited to this.

Figure 12:
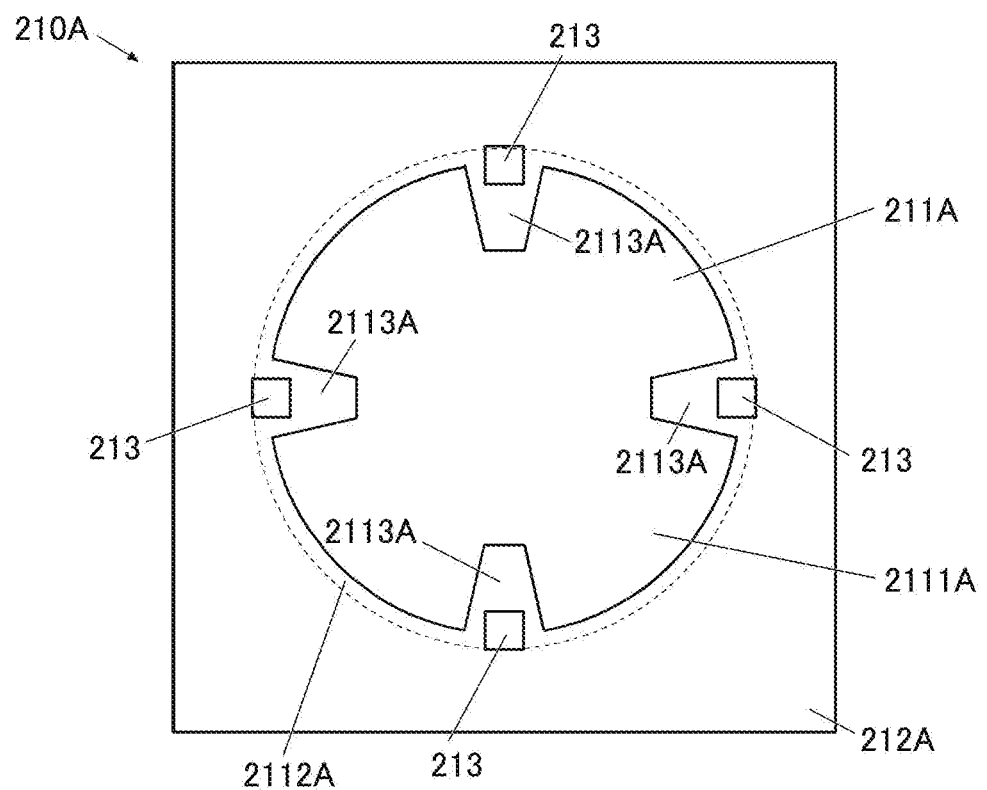
FIG. 12 is a plan view seen from the upper surface side of a pressure sensing element of a pressure sensor according to a modification example 1 of the second embodiment.

For example, as in a pressure sensing element 210A according to a modification example 1 shown in FIG. 12, the diaphragm 211A may be formed in a nearly circle shape in a plan view by removing the center on the lower surface side of the pressure sensing element 210A into a nearly circle shape in a plan view by the etching process or the like, an outer frame 2112A may be provided around the edge of the diaphragm 211A, and the diaphragm 211A and outer frame 2112A may be surrounded by frame 212A.

In this configuration, the trench 2111A on the diaphragm 211A may be formed in such a shape that the portions not facing the beams 2113A make arcs according to the shape of the entire diaphragm 211A.

The layer structure of the pressure sensing element is not limited to the above three-layer structure. For example, the structure may be a single-layer structure of silicon not having the $SiO_2$ layer as the insulation layer. For the supporting layer, materials such as glass may be used.

As for the configurations (circuit part 220, substrate 230 and nozzle 240) other than the pressure sensing element 210 in the pressure sensor 200, any configuration may be used as long as the configuration can function as a pressure sensor, and various modifications can be made.

For example, the above description has been made for a configuration in which air is introduced into the cavity on the lower surface side of the diaphragm 211 of the pressure sensing element 210 to make the lower surface side of the pressure sensing element 210 contact the air and the fluid which is the target to measure the pressure is introduced to the upper surface side. However, the through hole 231 may not be provided to the substrate 230 and the cavity surrounded by the diaphragm 211 and the frame 212 in the pressure sensing element 210 and the substrate 230 may be low vacuum. Alternatively, contrary to the above, the space on the upper surface side of the diaphragm 211 in the pressure sensing element 210 may be filled with air or may be made low vacuum, and the fluid which is the target to measure the pressure may be introduced into the cavity on the lower surface side.

EXAMPLES

[1 Test 1]

As for pressures sensors of examples according to the first embodiment and comparative examples, description will be made regarding the results of test related to the sensitivity and the output linearity.

[(1) Configurations of Examples and Comparative Examples]

The pressure sensors according to the following examples and comparative examples were prepared.

a Example 1

[(a) Configuration of Pressure Sensing Element]

Layer Structure: three layers that are an active layer (Si) 15 µm, a supporting layer (Si) 625 µm, and an insulation layer ($SiO_2$) between the active layer and the supporting layer Pressure Sensing Element Size: square with side length 2.0 mm in a plan view Diaphragm Size: square with side length 1.55 mm in a plan view Diaphragm Thickness: beam and outer frame 15 µm, trench 5 µm (trench depth 10 µm)

Piezoresistor Size: square with side length 30 µm in a plan view

Figure 13A:
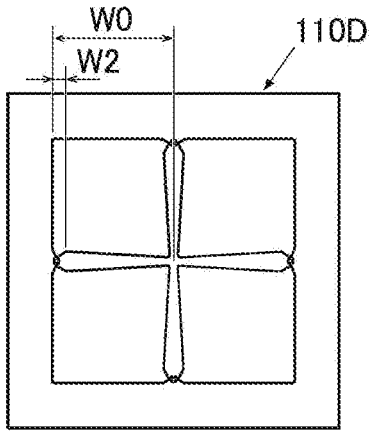
FIGS. 13A to 13I are plan views seen from the upper surface sides of pressure sensing elements of pressure sensors which were used as examples in test 1.

Beam Shape: shape having a wide portion at the following positions (pressure sensing element 110D shown in FIG. 13A)

Beam Width: wide portion 0.12 mm, end (narrow portion) 0.06 mm

Position of Wide Portion: W0=0.73 mm, W2=0.10 mm, W2/W0=0.14

As shown in FIG. 13A, W0 is the distance from the end along the outer frame of the trench to the central line of the beam parallel to the end, and W0 indicates the length of beam. W2 is the distance from the end along the outer frame of the trench to the straight line parallel to the end running through the wide portion. W2/W0 indicates the arrangement position of the wide portion in the beam.

Outer Frame: width 0.045 mm excluding a protrusion, the outer frame is formed to go round along the edge of the diaphragm Protrusion: width 0.06 mm at the connection part between the outer frame and the beam which is narrowest width 0.12 mm at the root portion having the widest width Trench area: $1.89=^2$

[(b) Configuration of Circuit Part]

Figure 15:
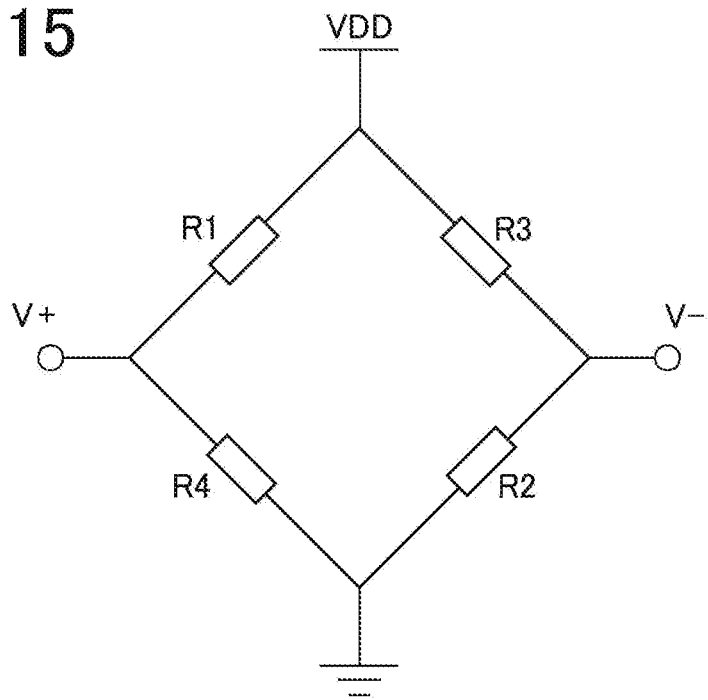
FIG. 15 is a view showing the circuit configuration of the pressure sensors used as the examples and the comparative examples in the tests 1 and 2.

As shown in FIG. 15.

In this configuration, each piezoresistor (Rn) changes by the pressure (stress) received by the diaphragm, and the Vout is output by the following formula according to the pressure.

$$Vout = (V+) - (V-)$$
$$= [R4/(R1+R4) \times VDD] - [R2/(R2+R3) \times VDD]$$

b Example 2

Figure 13B:
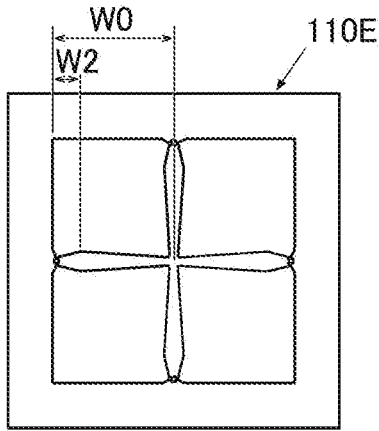

As in the pressure sensing element 110E shown in FIG. 13B, the position of the wide portion of the beam in the diaphragm is the position that satisfies W0=0.73 mm, W2=0.20 mm and W2/W0=0.27. The other configurations are similar to those of the Example 1.

c Example 3

Figure 13C:
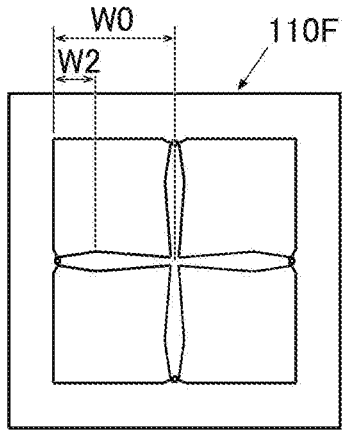

As in the pressure sensing element 110F shown in FIG. 13C, the position of the wide portion of the beam in the diaphragm is the position that satisfies W0=0.73 mm, W2=0.30 mm and W2/W0=0.41. The other configurations are similar to those of the Example 1.

d Example 4

Figure 13D:
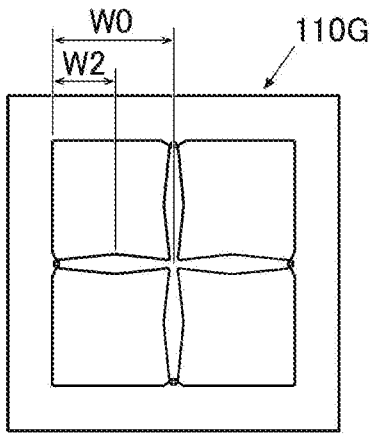

As in the pressure sensing element 110G shown in FIG. 13D, the position of the wide portion of the beam in the diaphragm is the position that satisfies W0=0.73 mm, W2=0.365 mm and W2/W0=0.50. The other configurations are similar to those of the Example 1.

e Example 5

Figure 13E:
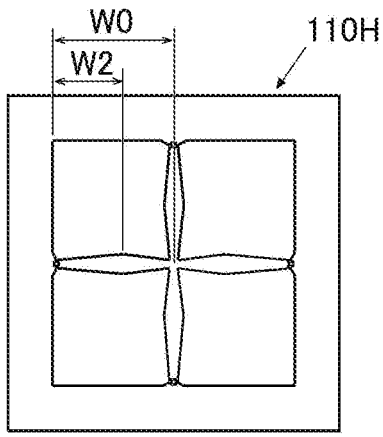

As in the pressure sensing element 110H shown in FIG. 13E, the position of the wide portion of the beam in the diaphragm is the position that satisfies W0=0.73 mm, W2=0.40 mm and W2/W0=0.55. The other configurations are similar to those of the Example 1.

f Example 6

Figure 13F:
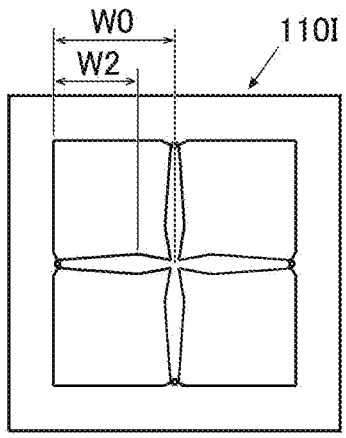

As in the pressure sensing element 110I shown in FIG. 13F, the position of the wide portion of the beam in the diaphragm is the position that satisfies W0=0.73 mm, W2=0.48 mm and W2/W0=0.66. The other configurations are similar to those of the Example 1.

g Example 7

Figure 13G:
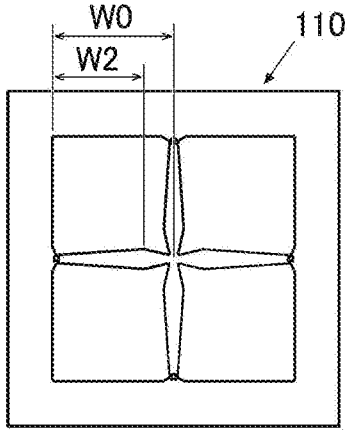

As in the pressure sensing element 110J shown in FIG. 13G, the position of the wide portion of the beam in the diaphragm is the position that satisfies W0=0.73 mm, W2=0.50 mm and W2/W0=0.68. The other configurations are similar to those of the Example 1.

h Example 8

Figure 13H:
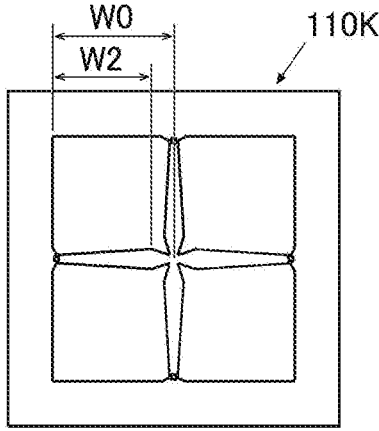

As in the pressure sensing element 110K shown in FIG. 13H, the position of the wide portion of the beam of the diaphragm is the position that satisfies W0=0.73 mm, W2=0.60 mm and W2/W0=0.82. The other configurations are similar to those of the Example 1.

i Example 9

Figure 13I:
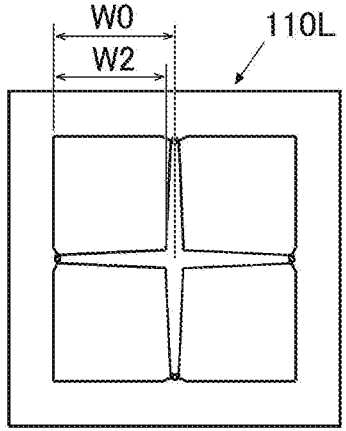

As in the pressure sensing element 110L shown in FIG. 13I, the position of the wide portion of the beam of the diaphragm is the position that satisfies W0=0.73 mm, W2=0.67 mm and W2/W0=0.92. The other configurations are similar to those of the Example 1.

j Comparative Example 1

Figure 14A:
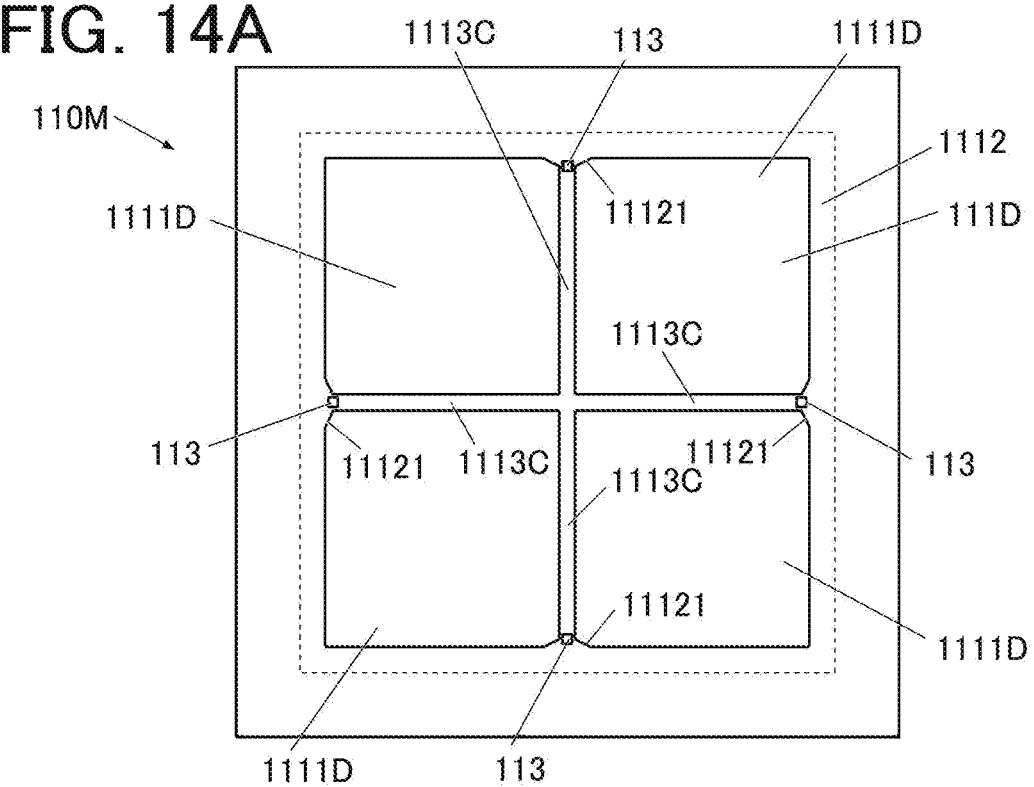
FIGS. 14A and 14B are plan views seen from the upper surface sides of pressure sensing elements of pressure sensors which were used as comparative examples in the test 1.

As in the pressure sensing element 110M shown in FIG. 14A, the trenches 1111D are formed such that the beam 1113C of the diaphragm 111D is in a straight line shape with the width of 0.06 mm. The other configurations are similar to those of the Example 1. In this configuration, the trench area is 1.98 mm$^2$.

k Comparative Example 2

Figure 14B:
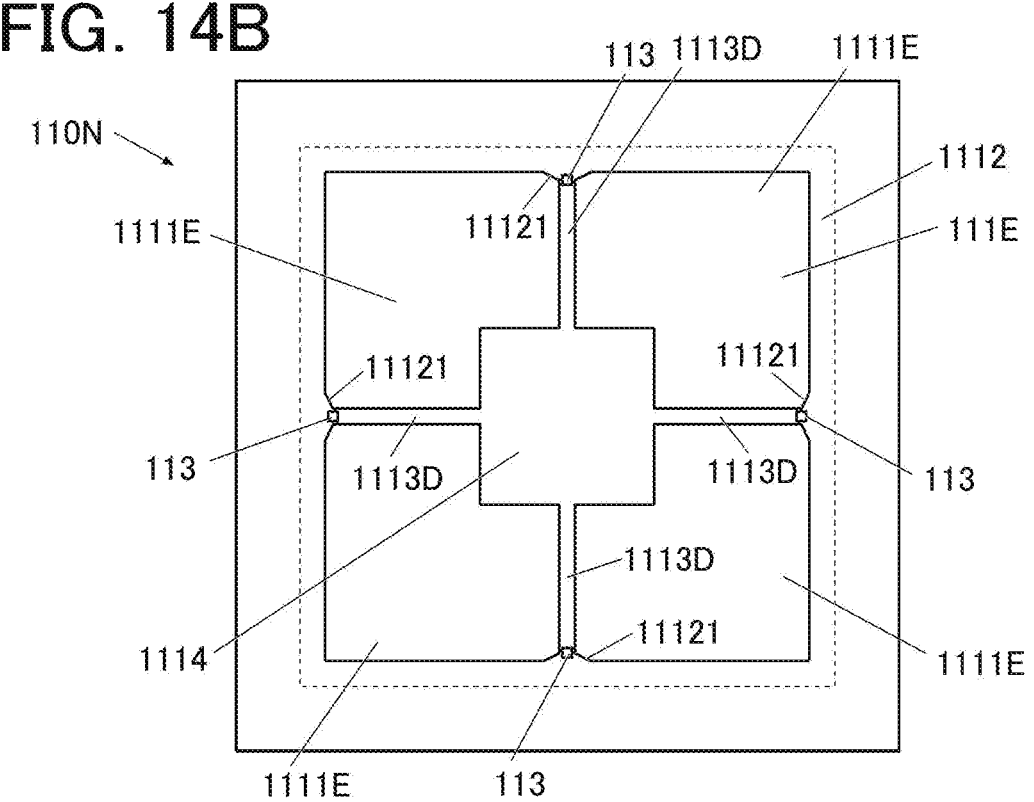

As in the pressure sensing element 110N shown in FIG. 14B, the trenches 1111E are formed such that the beam 1113D of the diaphragm 111E is in a straight line shape with the width of 0.06 mm, and a boss 1114 in a nearly square shape with each side length 0.5 mm is formed to have a similar thickness to the thickness of the beam, in the center of the diaphragm. The other configurations are similar to those of the Example 1. In this configuration, the trench area is 1.77 mm$^2$.

[(2) Test Method]

As for the pressure sensors according to the above examples and comparative examples, the span voltage (mV) and the output linearity (% FS) were calculated under the following conditions.

Temperature: normal temperature (25° C.)
Power Supply Voltage: 3.3V
Applied Pressure: 0 to −4 kPa (applied from the pressure sensing element lower surface (supporting layer side))
Span Voltage: output when −4 kPa is applied
Output Linearity: worst value

[(3) Test Results]

Figure 16:
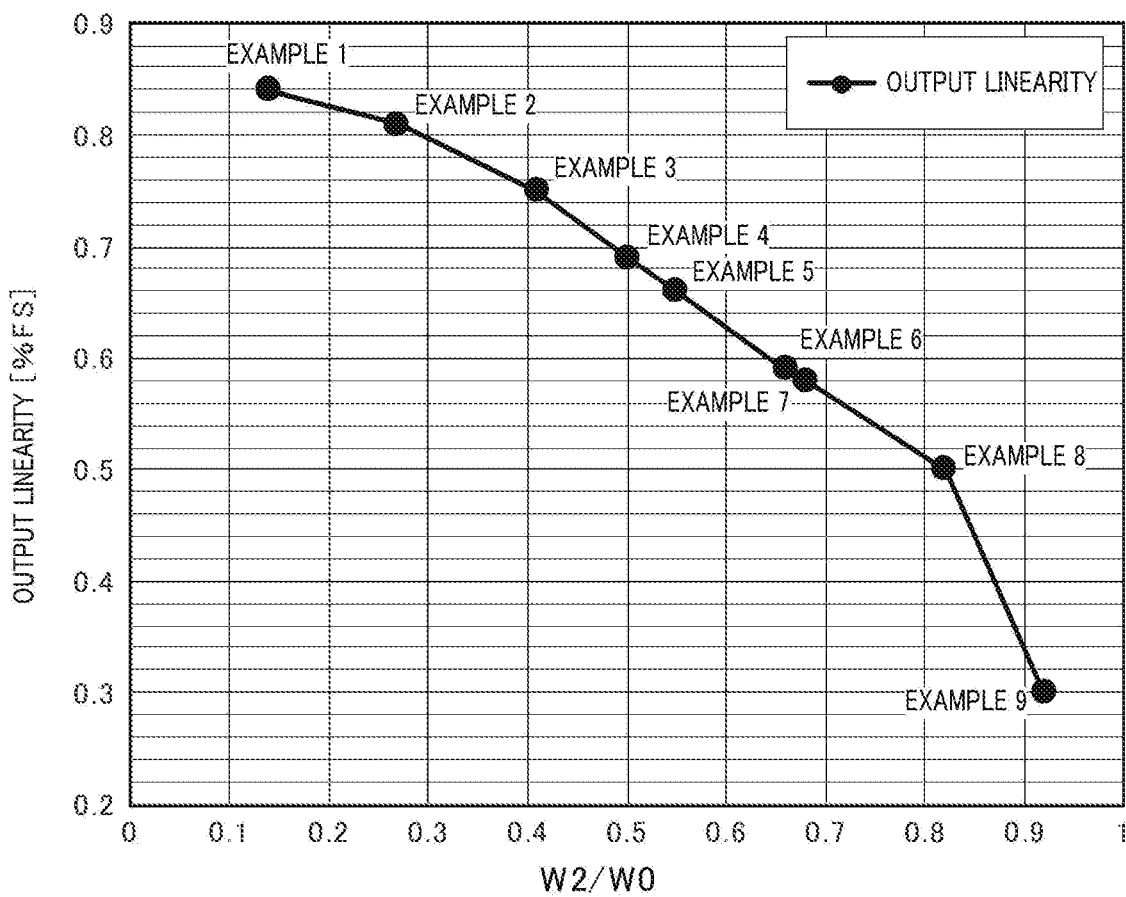
FIG. 16 is a graph showing test results related to the output linearity of the pressure sensors used as the examples in the test 1.
Figures 17, 18:
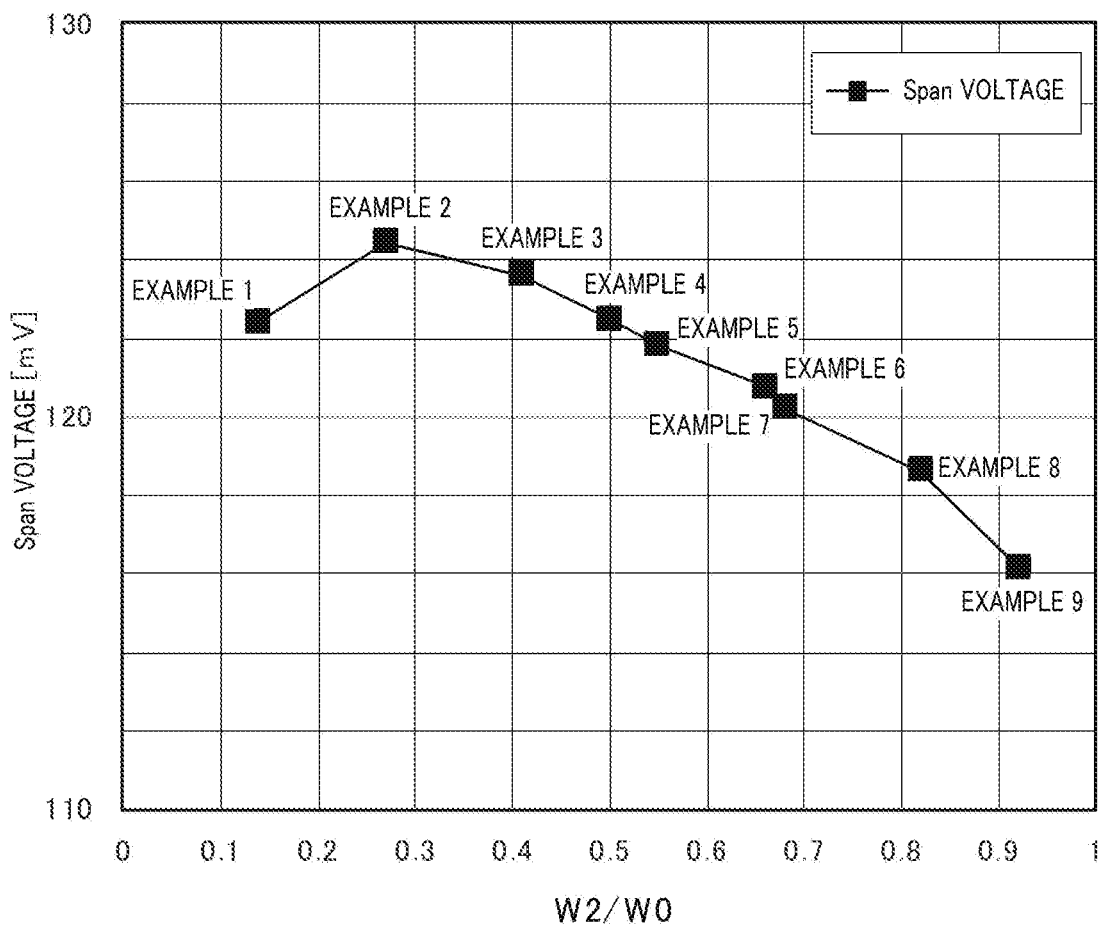
FIG. 17 is a graph showing test results related to the Span voltage of the pressure sensors used as the examples in the test 1.
FIG. 18 is a table showing test results related to the output linearity and the Span voltage of the pressure sensors used as the comparative examples in the test 1.

The test results are shown from FIG. 16 to FIG. 18.

[(4) Evaluation]

The comparison between the examples 1 to 9 and the comparative example 1 shows that it is possible to improve the output linearity by changing the shape of the beam from the straight line shape to the shape having the wide portion and the narrow portion.

The comparison between the Examples 1 to 9 and the comparative example 2 shows that the configuration providing the wide portion to the beam can more enable to improve the output linearity and avoid the reduction in sensitivity compared to the configuration of providing the boss to the diaphragm. That is, in the examples 1 to 9, though the effect of improving the output linearity is weak compared to the comparative example 2 which provides the boss on the diaphragm, the output linearity was improved compared to the comparative example 1 as described above. Furthermore, all of the examples 1 to 9 show high values of span voltage compared to the comparative example 2.

The comparison of examples 1 to 9 shows that the effect of improving the sensitivity is enhanced by locating the wide portion close to the edge of the diaphragm and the effect of improving the output linearity is enhanced by locating the wide portion close to the center of the diaphragm.

Accordingly, when a great importance is attached to improving the sensitivity, it is preferable to locate the wide portion closer to the edge of the diaphragm than the center in the longitudinal direction of the beam. When a great importance is attached to improving the output linearity, it is preferable to locate the wide portion closer to the center of the diaphragm than the center in the longitudinal direction of the beam. When a great importance is attached to the balance between improving the sensitivity and improving the output linearity, it is preferable to locate the wide portion around the center in the longitudinal direction of the beam.

In the example 1 in which the position of wide portion is closest to the edge of the diaphragm, the span voltage decreases compared to the examples 2 to 4. This decrease is caused since the stress at the position arranging the piezoresistor is decreased when the angle made by the wide portion and the narrow portion (connection part between the beam and the protrusion of the outer frame) of the end of the beam arranging the piezoresistor is excessively a steep angle. However, also in this case, the effect of improving the sensitivity is enhanced compared to the examples 5 to 9 in which the position of wide portion is closer to the center of diaphragm than the center in the longitudinal direction of the beam.

[2 Test 2]

As for pressure sensors of examples according to the second embodiment and comparative examples, description will be made regarding the results of test related to the sensitivity and the output linearity.

[(1) Configurations of Examples and Comparative Examples]

The pressure sensors according to the following examples and comparative examples were prepared.

a Example 10

[(a) Configuration of Pressure Sensing Element: Pressure Sensing Element 210B Shown in FIG. 19, having beams 2113B, outer frame 2112B, trench 2111B, diaphragm 211B, and frame 212B]

Layer Structure: three layers that are an active layer (Si) 5.0 μm, a supporting layer (Si) 625 μm, and an insulation layer ($SiO_2$) between the active layer and the supporting layer Pressure Sensing Element Size: nearly square with side length 1.0 mm in a plan view Diaphragm Size: nearly square with side length 0.426 mm in a plan view (shape with each corner rounded)

Diaphragm Thickness: beam and outer frame 5.0 μm, trench 3.5 μm (trench depth 1.5 μm)

Piezoresistor Size: nearly square with side length 60 μm in a plan view

Figure 19:
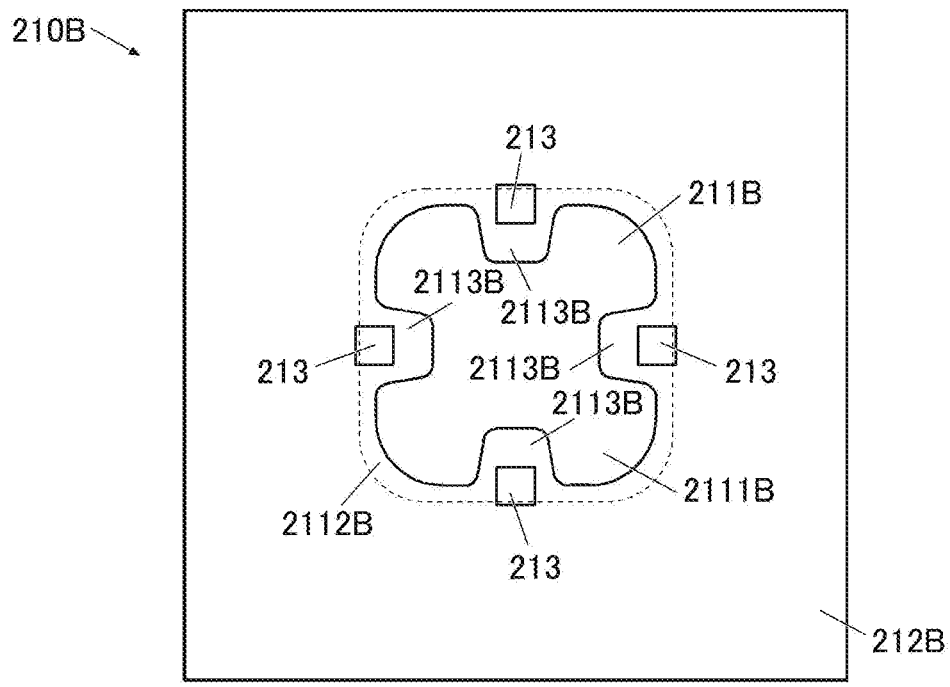
FIG. 19 is a plan view seen from the upper surface side of a pressure sensing element of a pressure sensor which was used as the example 10 in test 2.

Beam Shape: shape having a width that gradually becomes narrow toward the end from the root as shown in FIG. 19, the protruding length from the outer frame 0.085 mm (interval between opposite beams 0.25 mm)

Outer Frame: width 0.003 mm, formed to go round along the edge of the diaphragm

Diaphragm Area (Sd): 0.212 $mm^2$

Trench Area (St): 0.132$=^2$

St/Sd=0.62

[(b) Configuration of Circuit Part]

As shown in FIG. 15.

In this configuration, each piezoresistor (Rn) changes by the pressure (stress) received by the diaphragm, and the Vout is output by the following calculation formula according to the pressure.

$$Vout = (V+) - (V-)$$
$$= [R4/(R1 + R4) \times VDD] - [R2/(R2 + R3) \times VDD]$$

b Example 11

Figure 20:
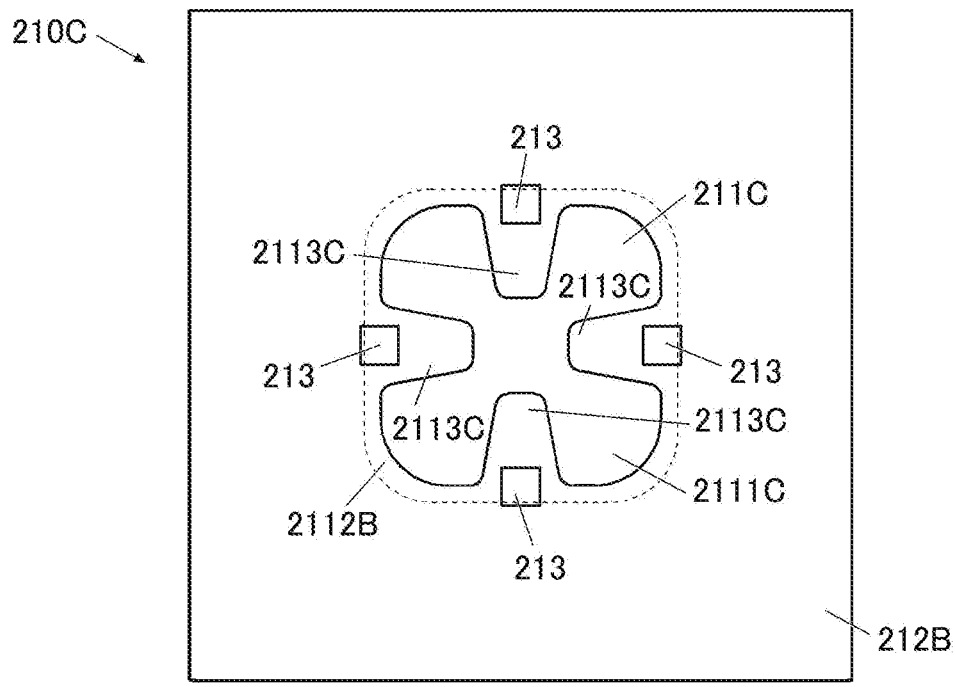
FIG. 20 is a plan view seen from the upper surface side of a pressure sensing element of a pressure sensor which was used as the example 11 in test 2.

As in the pressure sensing element 210C shown in FIG. 20, having beams 2113C, trench 2111C, and diaphragm 211C, the protruding length of beam is 0.135 mm (interval between opposite beams is 0.15 mm). In this configuration, diaphragm area (Sd) is 0.212 $mm^2$, trench area (St) is 0.118 $mm^2$, and St/Sd=0.56. The other configurations are similar to those of the Example 10.

c Comparative Example 3

Figure 21:
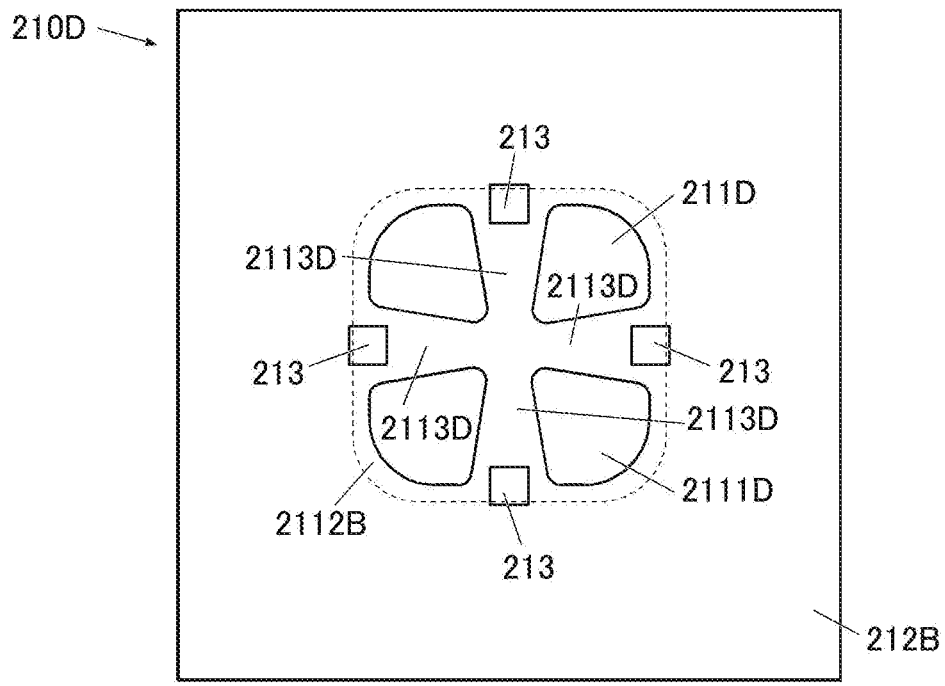
FIG. 21 is a plan view seen from the upper surface side of a pressure sensing element of a pressure sensor which was used as a comparative example 3 in the test 2.

As in the pressure sensing element 210D shown in FIG. 21, having beams 2113D, trenches 2111D, and diaphragm 211D, the beams are connected at the center of the diaphragm. In this configuration, diaphragm area (Sd) is 0.212 $mm^2$, trench area (St) is 0.049 $mm^2$, and St/Sd=0.23. The other configurations are similar to those of the Example 10.

d Comparative Example 4

Figure 22:
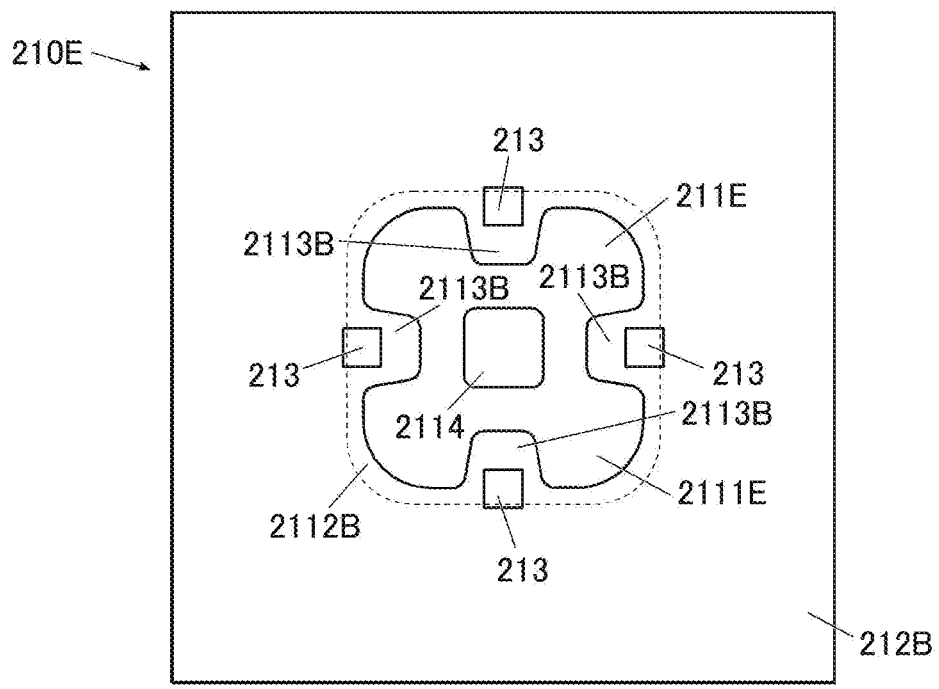
FIG. 22 is a plan view seen from the upper surface side of a pressure sensing element of a pressure sensor which was used as a comparative example 4 in the test 2.

As in the pressure sensing element 210E shown in FIG. 22, having trench 2111E and diaphragm 211E, the trench is not formed around the center of the diaphragm, and there is provided the portion (boss 2114) which is formed in a shape of a nearly square with each side length 0.12 mm having the four corners rounded and which has the same thickness (5.0 μm) as that of the beam and outer frame. In this configuration, diaphragm area (Sd) is 0.212 $mm^2$, trench area (St) is 0.118 $mm^2$, and St/Sd=0.56. The other configurations are similar to those of the Example 10.

e Comparative Example 5

Figure 23:
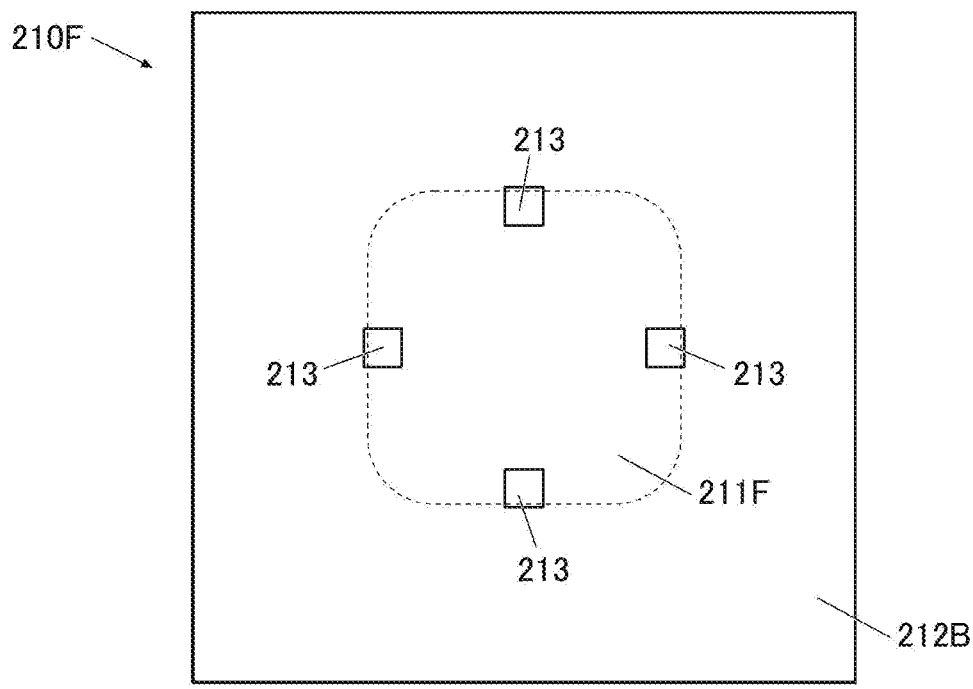
FIG. 23 is a plan view seen from the upper surface side of pressure sensing elements of pressure sensors used as the comparative examples 5 and 6 in the test 2.

As in the pressure sensing element 210F shown in FIG. 23, having diaphragm 211F, the trench is not provided in the diaphragm, and the entire thickness of the diaphragm is 3.5 μm. In this configuration, diaphragm area (Sd) is 0.212 $mm^2$, trench area (St) is 0 $mm^2$, and St/Sd=0. The other configurations are similar to those of the Example 10.

f Comparative Example 6

As in the pressure sensing element 210F shown in FIG. 23, the trench is not provided in the diaphragm, and the entire thickness of the diaphragm is 5.0 μm. In this configuration, diaphragm area (Sd) is 0.212$=^2$, trench area (St) is 0 $mm^2$, and St/Sd=0. The other configurations are similar to those of the Example 10.

[(2) Test Method]

As for the pressure sensors according to the above examples and comparative examples, the span voltage (mV) and the output linearity (% FS) were calculated under the following conditions.

Temperature: normal temperature (25° C.)

Power Supply Voltage: 3.3V

Applied Pressure: 0 to 10 kPa (applied from the pressure sensing element lower surface (supporting layer side))

Span Voltage: output when 10 kPa is applied

Output Linearity: worst value

[(3) Test Results]

Figure 24:
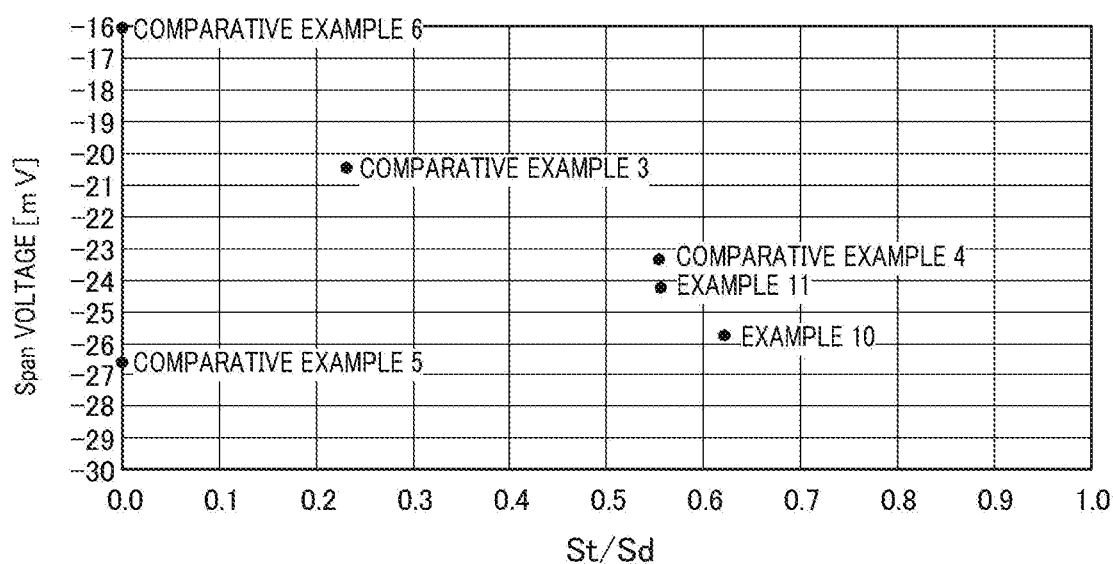
FIG. 24 is a graph showing the results of sensitivity test for the pressure sensors used as the examples and the comparative examples in the test 2.
Figure 25:
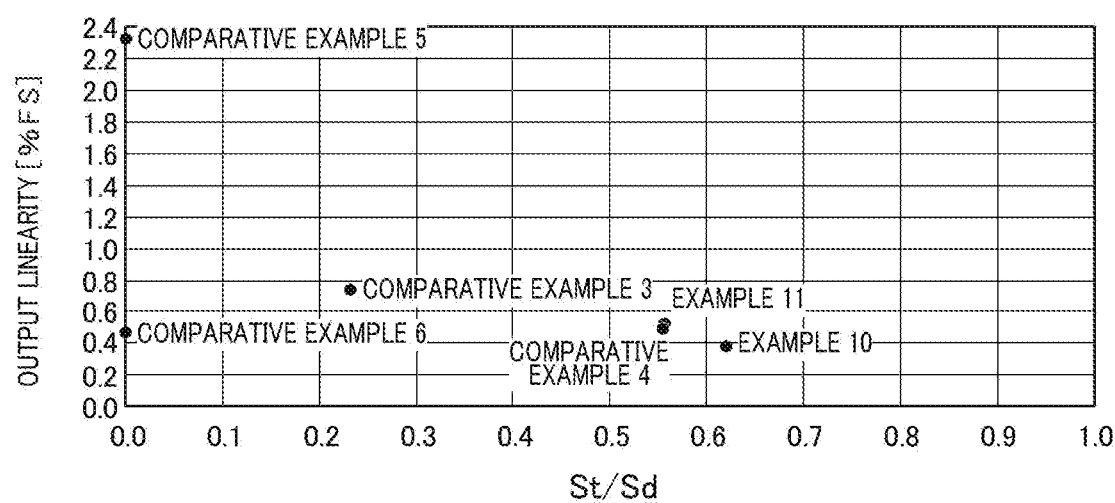
FIG. 25 is a graph showing the results of output linearity test for the pressure sensors used as the examples and the comparative examples in the test 2.

The test results are shown in FIGS. 24 and 25.

[(4) Evaluation]

The comparison between the examples 10 and 11 and the comparative examples 5 and 6 shows that it is possible to improve both of the sensitivity and the output linearity by forming the trench while leaving the beams on the diaphragm.

That is, when compared to the comparative example 5 in which the entire thickness of the diaphragm is 3.5 μm, in the examples 10 and 11, the output linearity is greatly improved in return for the slight decrease of Span voltage. When compared to the comparative example 6 in which the entire thickness of the diaphragm is 5.0 μm, the output linearity is slightly improved and the sensitivity is greatly improved in the example 10, and the output linearity is nearly equal and the sensitivity is greatly improved in the example 11.

The comparison of examples 10 and 11 with the comparative example 3 shows that it is possible to more improve the sensitivity and the output linearity by forming beams independent from each other and not reaching the center of the diaphragm, and forming the trench to be continuous in the range including the center of the diaphragm, compared to a configuration in which the beam that is the portion not forming the trench on the diaphragm is formed in a nearly cross shape.

The comparison between the example 10 and the comparative example 4 shows that, when the size of beam is equal, it is possible to more improve the sensitivity and the output linearity by forming the trench in a range including the center of the diaphragm without leaving the thick portion at the center of the diaphragm.

From the comparison of the example 11 with the comparative example 4, it can be said that, even when the trench area is same, the example 11 is preferable since the output linearity is nearly equal and the sensitivity is improved when compared to the comparative example 4. In the pressure sensor, though both of the sensitivity and the output linearity are important elements, the output linearity can be corrected to some degrees in the ASIC. Thus, it is the sensitivity that more needs to be improved by the configuration of the pressure sensing element.

Furthermore, also from the viewpoint of easiness of making the pressure sensing element small, it can be said that the example 11 is preferable to the comparative example 4. That is, in the comparative example 4, since the trench needs to be formed in a circle leaving the center of the diaphragm, it becomes more difficult to form the trench as designed and make the boss 2114 of a planned size when the pressure sensing element is made smaller, the boss 2114 being the thick portion in the center. On the other hand, according to the example 11, since the trench is formed to be continuous in the range including the center of the diaphragm and the shape is extremely simple, it is easy to make the trench of a designed area even when the pressure sensing element is made small.

According to the above embodiments, it is possible to provide a pressure sensor which improves both of the detection sensitivity and the output linearity.

Although some embodiments of the present invention have been described and illustrated in detail, the disclosed embodiments are made for purposes of not limitation but illustration and example only. The scope of the present invention should be interpreted by terms of the appended claims.

What is claimed is:

1. A pressure sensing element that is formed using a semiconductor substrate, the pressure sensing element comprising:
   a frame;
   a diaphragm that is supported by the frame; and
   a piezoresistor that is arranged on the diaphragm,
   wherein:
   the diaphragm includes a trench and a plurality of beams,
   the beams are arranged such that the beams connect a portion around an edge of the diaphragm to a portion around a center of the diaphragm and the beams cross each other in the portion around the center of the diaphragm,
   each of the beams includes a narrow portion that has a first width and a wide portion that has a second width wider than the first width, and
   in each of the beams, (i) the wide portion is provided around a center in a longitudinal direction of the beam, and (ii) a width of the beam gradually becomes wider toward the wide portion from the narrow portion, the narrow portion being provided at a first end of the beam closer to the edge of the diaphragm and at a second end of the beam closer to the center of the diaphragm.

2. The pressure sensing element according to claim 1, wherein a shape of the beam is defined by the trench that is formed in a range not penetrating the diaphragm.

3. The pressure sensing element according to claim 1, wherein the piezoresistor is arranged around the first end of the beam.

4. The pressure sensing element according to claim 3, wherein the piezoresistor is arranged at a position overlapping with the narrow portion provided at the first end of the beam.

5. The pressure sensing element according to claim 1, wherein an outer frame that is thicker than the trench is provided at the edge of the diaphragm.

6. The pressure sensing element according to claim 5, wherein the trench does not extend to the edge of the diaphragm, and the outer frame is provided around the edge of the diaphragm.

7. The pressure sensing element according to claim 5, wherein:
   the outer frame includes a protrusion at a connection part between the outer frame and the beam, the protrusion protruding in a direction toward the center of the diaphragm and having a width that gradually becomes narrower toward the connection part between the outer frame and the beam, and
   the piezoresistor is arranged at a connection part between the beam and the protrusion.

8. A pressure sensor comprising the pressure sensing element according to claim 1.

9. The pressure sensor according to claim 8, further comprising:
   a substrate on which the pressure sensing element is mounted; and
   a nozzle through which a fluid that is a target of pressure sensing is introduced to the pressure sensing element.

10. A pressure sensing element that is formed using a semiconductor substrate, the pressure sensing element comprising:
    a frame;
    a diaphragm that is supported by the frame; and
    a piezoresistor that is arranged on the diaphragm,
    wherein:
    the diaphragm includes a trench and a plurality of beams,
    the beams are arranged such that the beams connect a portion around an edge of the diaphragm to a portion around a center of the diaphragm and the beams cross each other in the portion around the center of the diaphragm,
    each of the beams includes a narrow portion that has a first width and a wide portion that has a second width wider than the first width, and
    in each of the beams, (i) the wide portion is provided at a position closer to the center of the diaphragm than a center in a longitudinal direction of the beam, and (ii) a width of the beam gradually becomes wider toward the wide portion from the narrow portion that is provided around an end close to the edge of the diaphragm.

11. A pressure sensing element that is formed using a semiconductor substrate, the pressure sensing element comprising:
    a frame;
    a diaphragm that is supported by the frame; and
    a piezoresistor that is arranged on the diaphragm,
    wherein:
    the diaphragm includes a trench and a plurality of beams,
    the beams are arranged such that the beams connect a portion around an edge of the diaphragm to a portion around a center of the diaphragm and the beams cross each other in the portion around the center of the diaphragm,
    each of the beams includes a narrow portion that has a first width and a wide portion that has a second width wider than the first width, and in each of the beams, (i) the wide portion is provided at a position closer to the edge of the diaphragm than a center in a longitudinal direction of the beam, and (ii) a width of the beam gradually becomes wider toward the wide portion from the narrow portion that is provided around an end close to the center of the diaphragm.

12. A pressure sensing element that is formed using a semiconductor substrate, the pressure sensing element comprising:
    a frame;
    a diaphragm that is supported by the frame; and
    a piezoresistor that is arranged on the diaphragm,
    wherein the diaphragm includes:
        a beam that protrudes in a direction toward a center of the diaphragm from an edge of the diaphragm; and
        a single trench that is formed in a range ranging from the edge of the diaphragm and the beam and including the center of the diaphragm.

13. The pressure sensing element according to claim 12, wherein a shape of the beam is defined by the trench that is formed in a range not penetrating the diaphragm.

14. The pressure sensing element according to claim 12, wherein the piezoresistor is arranged around an end of the beam, the end being close to the edge of the diaphragm.

15. The pressure sensing element according to claim 12, wherein a width of the beam gradually becomes narrower in the direction toward the center of the diaphragm.

16. The pressure sensing element according to claim 12, wherein the diaphragm includes an outer frame that is provided around the edge of the diaphragm.

17. The pressure sensing element according to claim 16, wherein the piezoresistor is arranged at a connection part between the beam and the outer frame.

18. A pressure sensor comprising:
    the pressure sensing element according to claim 14;
    a substrate on which the pressure sensing element is mounted; and
    a nozzle through which a fluid that is a target of pressure sensing is introduced to the pressure sensing element.

* * * * *

UNITED STATES PATENT AND TRADEMARK OFFICE
CERTIFICATE OF CORRECTION

| | |
|---|---|
| PATENT NO. | : 11,530,959 B2 |
| APPLICATION NO. | : 17/006981 |
| DATED | : December 20, 2022 |
| INVENTOR(S) | : Takayuki Mori |

It is certified that error appears in the above-identified patent and that said Letters Patent is hereby corrected as shown below:

In the Claims

Column 22, Line 14 (Claim 18, Line 2), delete "14" and insert --12--.

Signed and Sealed this
Fourteenth Day of March, 2023

Katherine Kelly Vidal
*Director of the United States Patent and Trademark Office*